(12) United States Patent
Wakide et al.

(10) Patent No.: US 8,176,369 B2
(45) Date of Patent: May 8, 2012

(54) COUNT DATA RECORDING DEVICE, AND METHOD AND PROGRAM FOR RECORDING COUNT DATA

(75) Inventors: Hitoshi Wakide, Toyokawa (JP); Hideo Mae, Nagoya (JP); Yasufumi Naitou, Toyokawa (JP); Yoshihiko Yoshizaki, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 206 days.

(21) Appl. No.: 12/638,678

(22) Filed: Dec. 15, 2009

(65) Prior Publication Data

US 2010/0153772 A1    Jun. 17, 2010

(30) Foreign Application Priority Data

Dec. 16, 2008 (JP) ................................. 2008-319326

(51) Int. Cl.
*G06F 11/07* (2006.01)
*G06F 11/36* (2006.01)

(52) U.S. Cl. ........................................ 714/706; 714/746
(58) Field of Classification Search ........................ None
See application file for complete search history.

(56) References Cited

U.S. PATENT DOCUMENTS

| 5,406,606 | A * | 4/1995 | Sekiya ............................ 377/28 |
| 5,621,911 | A * | 4/1997 | Nakamoto ..................... 711/118 |
| 2005/0261790 | A1* | 11/2005 | Park et al. ........................ 700/94 |
| 2007/0133889 | A1* | 6/2007 | Horie et al. ................... 382/232 |
| 2008/0177524 | A1* | 7/2008 | Otsuki ............................ 703/15 |

FOREIGN PATENT DOCUMENTS

| JP | 5-77718 U | 10/1993 |
| JP | 7-78232 | 3/1995 |
| JP | 9-179789 A | 7/1997 |
| JP | 2000-172133 | 6/2000 |

OTHER PUBLICATIONS

Japanese Notice of Grant issued Jul. 20, 2010 directed to counterpart Japanese Application No. 2008-319326; 3 pages.

* cited by examiner

*Primary Examiner* — Jeffrey A Gaffin
*Assistant Examiner* — Dipakkumar Gandhi
(74) *Attorney, Agent, or Firm* — Morrison & Foerster LLP

(57) ABSTRACT

The count data recording device includes: a storage unit including N memory areas; and a data restoring unit that detects a corruption in the count data pieces and restores the corruption, wherein the data writing unit records the count data piece using the memory area included in the range of the minor loop according to the predetermined order and shifts the range of the minor loop backward after recording the count data piece using a last memory area within the minor loop.

12 Claims, 37 Drawing Sheets

7
STORAGE DEVICE
(MEMORY)

Fig.6

| COUNT NUMBER | ADDRESS[1] | ADDRESS[2] | ADDRESS[3] | ADDRESS[4] | ADDRESS[5] | ADDRESS[6] |
|---|---|---|---|---|---|---|
| 0 (INITIAL VALUE) | -1 | 0 | -11 | -8 | -5 | -2 |
| 1 | 1 | 0 | -11 | -8 | -5 | -2 |
| 2 | 1 | 2 | -11 | -8 | -5 | -2 |
| 3 | 1 | 2 | 3 | -8 | -5 | -2 |
| 4 | 1 | 4 | 3 | -8 | -5 | -2 |
| 5 | 1 | 4 | 5 | -8 | -5 | -2 |
| 6 | 1 | 4 | 5 | 6 | -5 | -2 |
| 7 | 1 | 4 | 7 | 6 | -5 | -2 |
| 8 | 1 | 4 | 7 | 8 | -5 | -2 |
| 9 | 1 | 4 | 7 | 8 | 9 | -2 |
| 10 | 1 | 4 | 7 | 10 | 9 | -2 |
| 11 | 1 | 4 | 7 | 10 | 11 | -2 |
| 12 | 1 | 4 | 7 | 10 | 13 | 12 |
| 13 | 1 | 4 | 7 | 10 | 13 | 12 |
| 14 | 1 | 4 | 7 | 10 | 13 | 14 |
| 15 | 15 | 4 | 7 | 10 | 13 | 14 |
| 16 | 15 | 4 | 7 | 10 | 13 | 16 |
| 17 | 17 | 4 | 7 | 10 | 13 | 16 |
| 18 | 17 | 18 | 7 | 10 | 13 | 16 |
| 19 | 19 | 18 | 7 | 10 | 13 | 16 |
| 20 | 19 | 20 | 7 | 10 | 13 | 16 |
| 21 | 19 | 20 | 21 | 10 | 13 | 16 |
| 22 | 19 | 22 | 21 | 10 | 13 | 16 |
| 23 | 19 | 22 | 23 | 10 | 13 | 16 |
| 24 | 19 | 22 | 23 | 24 | 13 | 16 |
| 25 | 19 | 22 | 25 | 24 | 13 | 16 |
| 26 | 19 | 22 | 25 | 26 | 13 | 16 |

Fig.7

| COUNT NUMBER | I. | II. | III. | IV. | V. | VI. | ADDRESS SEQUENCE PATTERN |
|---|---|---|---|---|---|---|---|
| 0 (INITIAL VALUE) | 0<br>ADDRESS[2] | -1<br>ADDRESS[1] | -2<br>ADDRESS[6] | -5<br>ADDRESS[5] | -8<br>ADDRESS[4] | -11<br>ADDRESS[3] | PATTERN [01] |
| 1 | 1<br>ADDRESS[1] | 0<br>ADDRESS[2] | -2<br>ADDRESS[6] | -5<br>ADDRESS[5] | -8<br>ADDRESS[4] | -11<br>ADDRESS[3] | PATTERN [02] |
| 2 | 2<br>ADDRESS[2] | 1<br>ADDRESS[1] | -2<br>ADDRESS[6] | -5<br>ADDRESS[5] | -8<br>ADDRESS[4] | -11<br>ADDRESS[3] | |
| 3 | 3<br>ADDRESS[3] | 2<br>ADDRESS[2] | 1<br>ADDRESS[1] | -2<br>ADDRESS[6] | -5<br>ADDRESS[5] | -8<br>ADDRESS[4] | PATTERN [03] |
| 4 | 4<br>ADDRESS[2] | 3<br>ADDRESS[3] | 1<br>ADDRESS[1] | -2<br>ADDRESS[6] | -5<br>ADDRESS[5] | -8<br>ADDRESS[4] | PATTERN [04] |
| 5 | 5<br>ADDRESS[3] | 4<br>ADDRESS[2] | 1<br>ADDRESS[1] | -2<br>ADDRESS[6] | -5<br>ADDRESS[5] | -8<br>ADDRESS[4] | |
| 6 | 6<br>ADDRESS[4] | 5<br>ADDRESS[3] | 4<br>ADDRESS[2] | 1<br>ADDRESS[1] | -2<br>ADDRESS[6] | -5<br>ADDRESS[5] | PATTERN [05] |
| 7 | 7<br>ADDRESS[3] | 6<br>ADDRESS[4] | 4<br>ADDRESS[2] | 1<br>ADDRESS[1] | -2<br>ADDRESS[6] | -5<br>ADDRESS[5] | PATTERN [06] |
| 8 | 8<br>ADDRESS[4] | 7<br>ADDRESS[3] | 4<br>ADDRESS[2] | 1<br>ADDRESS[1] | -2<br>ADDRESS[6] | -5<br>ADDRESS[5] | |
| 9 | 9<br>ADDRESS[5] | 8<br>ADDRESS[4] | 7<br>ADDRESS[3] | 4<br>ADDRESS[2] | 1<br>ADDRESS[1] | -2<br>ADDRESS[6] | PATTERN [07] |
| 10 | 10<br>ADDRESS[4] | 9<br>ADDRESS[5] | 7<br>ADDRESS[3] | 4<br>ADDRESS[2] | 1<br>ADDRESS[1] | -2<br>ADDRESS[6] | PATTERN [08] |
| 11 | 11<br>ADDRESS[5] | 10<br>ADDRESS[4] | 7<br>ADDRESS[3] | 4<br>ADDRESS[2] | 1<br>ADDRESS[1] | -2<br>ADDRESS[6] | |
| 12 | 12<br>ADDRESS[6] | 11<br>ADDRESS[5] | 10<br>ADDRESS[4] | 7<br>ADDRESS[3] | 4<br>ADDRESS[2] | 1<br>ADDRESS[1] | PATTERN [09] |
| 13 | 13<br>ADDRESS[5] | 12<br>ADDRESS[6] | 10<br>ADDRESS[4] | 7<br>ADDRESS[3] | 4<br>ADDRESS[2] | 1<br>ADDRESS[1] | PATTERN [10] |
| 14 | 14<br>ADDRESS[6] | 13<br>ADDRESS[5] | 10<br>ADDRESS[4] | 7<br>ADDRESS[3] | 4<br>ADDRESS[2] | 1<br>ADDRESS[1] | |
| 15 | 15<br>ADDRESS[1] | 14<br>ADDRESS[6] | 13<br>ADDRESS[5] | 10<br>ADDRESS[4] | 7<br>ADDRESS[3] | 4<br>ADDRESS[2] | PATTERN [11] |
| 16 | 16<br>ADDRESS[6] | 15<br>ADDRESS[1] | 13<br>ADDRESS[5] | 10<br>ADDRESS[4] | 7<br>ADDRESS[3] | 4<br>ADDRESS[2] | PATTERN [12] |
| 17 | 17<br>ADDRESS[1] | 16<br>ADDRESS[6] | 13<br>ADDRESS[5] | 10<br>ADDRESS[4] | 7<br>ADDRESS[3] | 4<br>ADDRESS[2] | |
| 18 | 18<br>ADDRESS[2] | 17<br>ADDRESS[1] | 16<br>ADDRESS[6] | 13<br>ADDRESS[5] | 10<br>ADDRESS[4] | 7<br>ADDRESS[3] | |
| 19 | 19<br>ADDRESS[1] | 18<br>ADDRESS[2] | 16<br>ADDRESS[6] | 13<br>ADDRESS[5] | 10<br>ADDRESS[4] | 7<br>ADDRESS[3] | |
| 20 | 20<br>ADDRESS[2] | 19<br>ADDRESS[1] | 16<br>ADDRESS[6] | 13<br>ADDRESS[5] | 10<br>ADDRESS[4] | 7<br>ADDRESS[3] | |
| 21 | 21<br>ADDRESS[3] | 20<br>ADDRESS[2] | 19<br>ADDRESS[1] | 16<br>ADDRESS[6] | 13<br>ADDRESS[5] | 10<br>ADDRESS[4] | |
| 22 | 22<br>ADDRESS[2] | 21<br>ADDRESS[3] | 19<br>ADDRESS[1] | 16<br>ADDRESS[6] | 13<br>ADDRESS[5] | 10<br>ADDRESS[4] | |
| 23 | 23<br>ADDRESS[3] | 22<br>ADDRESS[2] | 19<br>ADDRESS[1] | 16<br>ADDRESS[6] | 13<br>ADDRESS[5] | 10<br>ADDRESS[4] | |
| 24 | 24<br>ADDRESS[4] | 23<br>ADDRESS[3] | 22<br>ADDRESS[2] | 19<br>ADDRESS[1] | 16<br>ADDRESS[6] | 13<br>ADDRESS[5] | |
| 25 | 25<br>ADDRESS[3] | 24<br>ADDRESS[4] | 22<br>ADDRESS[2] | 19<br>ADDRESS[1] | 16<br>ADDRESS[6] | 13<br>ADDRESS[5] | |
| 26 | 26<br>ADDRESS[4] | 25<br>ADDRESS[3] | 22<br>ADDRESS[2] | 19<br>ADDRESS[1] | 16<br>ADDRESS[6] | 13<br>ADDRESS[5] | |

Fig. 8

| I. | II. | III. | IV. | V. | VI. | COUNT DATA ADDRESS SEQUENCE PATTERN |
|---|---|---|---|---|---|---|
| ADDRESS[2] | ADDRESS[1] | ADDRESS[6] | ADDRESS[5] | ADDRESS[4] | ADDRESS[3] | COUNT DATA ADDRESS SEQUENCE PATTERN[01] |
| ADDRESS[1] | ADDRESS[2] | ADDRESS[6] | ADDRESS[5] | ADDRESS[4] | ADDRESS[3] | COUNT DATA ADDRESS SEQUENCE PATTERN[02] |
| ADDRESS[3] | ADDRESS[2] | ADDRESS[1] | ADDRESS[6] | ADDRESS[5] | ADDRESS[4] | COUNT DATA ADDRESS SEQUENCE PATTERN[03] |
| ADDRESS[2] | ADDRESS[3] | ADDRESS[1] | ADDRESS[6] | ADDRESS[5] | ADDRESS[4] | COUNT DATA ADDRESS SEQUENCE PATTERN[04] |
| ADDRESS[4] | ADDRESS[3] | ADDRESS[2] | ADDRESS[1] | ADDRESS[6] | ADDRESS[5] | COUNT DATA ADDRESS SEQUENCE PATTERN[05] |
| ADDRESS[3] | ADDRESS[4] | ADDRESS[2] | ADDRESS[1] | ADDRESS[6] | ADDRESS[5] | COUNT DATA ADDRESS SEQUENCE PATTERN[06] |
| ADDRESS[5] | ADDRESS[4] | ADDRESS[3] | ADDRESS[2] | ADDRESS[1] | ADDRESS[6] | COUNT DATA ADDRESS SEQUENCE PATTERN[07] |
| ADDRESS[4] | ADDRESS[5] | ADDRESS[3] | ADDRESS[2] | ADDRESS[1] | ADDRESS[6] | COUNT DATA ADDRESS SEQUENCE PATTERN[08] |
| ADDRESS[6] | ADDRESS[5] | ADDRESS[4] | ADDRESS[3] | ADDRESS[2] | ADDRESS[1] | COUNT DATA ADDRESS SEQUENCE PATTERN[09] |
| ADDRESS[5] | ADDRESS[6] | ADDRESS[4] | ADDRESS[3] | ADDRESS[2] | ADDRESS[1] | COUNT DATA ADDRESS SEQUENCE PATTERN[10] |
| ADDRESS[1] | ADDRESS[6] | ADDRESS[5] | ADDRESS[4] | ADDRESS[3] | ADDRESS[2] | COUNT DATA ADDRESS SEQUENCE PATTERN[11] |
| ADDRESS[6] | ADDRESS[1] | ADDRESS[5] | ADDRESS[4] | ADDRESS[3] | ADDRESS[2] | COUNT DATA ADDRESS SEQUENCE PATTERN[12] |

Fig.9

| | COUNT DATA DIFFERENCE VALUE SEQUENCE PATTERN | 1 | 2 | 3 | 4 | . . . | M-1 | M | |
|---|---|---|---|---|---|---|---|---|---|
| (N-1)TH COUNT DATA DIFFERENCE VALUE | | M | M | M | M | . . . | M | M | ⎫ |
| (N-2)TH COUNT DATA DIFFERENCE VALUE | | M | M | M | M | . . . | M | M | ⎬ 43 |
| ...... | | M | M | M | ⋮ | . . . | ⋮ | ⋮ | |
| ...... | | M | M | M | ⋮ | . . . | ⋮ | ⋮ | |
| (M+1)TH COUNT DATA DIFFERENCE VALUE | | M | M | M | M | . . . | M | M | |
| M-TH COUNT DATA DIFFERENCE VALUE | | M | M | M | M | . . . | M | M | ⎭ |
| (M-1)TH COUNT DATA DIFFERENCE VALUE | | 1 | 2 | 3 | 4 | . . . | M-1 | M | } 41 |
| (M-2)TH COUNT DATA DIFFERENCE VALUE | | 1 | 1 | 1 | 1 | . . . | 1 | 1 | |
| (M-3)TH COUNT DATA DIFFERENCE VALUE | | 1 | 1 | 1 | 1 | . . . | 1 | 1 | |
| ...... | | ⋮ | ⋮ | ⋮ | ⋮ | . . . | ⋮ | ⋮ | |
| THIRD COUNT DATA DIFFERENCE VALUE | | 1 | 1 | 1 | 1 | . . . | 1 | 1 | |
| SECOND COUNT DATA DIFFERENCE VALUE | | 1 | 1 | 1 | 1 | . . . | 1 | 1 | |
| FIRST COUNT DATA DIFFERENCE VALUE | | 1 | 1 | 1 | 1 | . . . | 1 | 1 | |
| COUNT DATA DIFFERENCE VALUE SEQUENCE PATTERN | | 1 | 2 | 3 | 4 | . . . | M-1 | M | |

Fig. 10

| COUNT NUMBER | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| 0 (INITIAL VALUE) | 1 | 1 | 3 | 3 | 3 |
| 1 | 1 | 2 | 3 | 3 | 3 |
| 2 | 1 | 3 | 3 | 3 | 3 |
| 3 | 1 | 1 | 3 | 3 | 3 |
| 4 | 1 | 2 | 3 | 3 | 3 |
| 5 | 1 | 3 | 3 | 3 | 3 |
| 6 | 1 | 1 | 3 | 3 | 3 |
| 7 | 1 | 2 | 3 | 3 | 3 |
| 8 | 1 | 3 | 3 | 3 | 3 |
| 9 | 1 | 1 | 3 | 3 | 3 |
| 10 | 1 | 2 | 3 | 3 | 3 |
| 11 | 1 | 3 | 3 | 3 | 3 |
| 12 | 1 | 1 | 3 | 3 | 3 |
| 13 | 1 | 2 | 3 | 3 | 3 |
| 14 | 1 | 3 | 3 | 3 | 3 |
| 15 | 1 | 1 | 3 | 3 | 3 |
| 16 | 1 | 2 | 3 | 3 | 3 |
| 17 | 1 | 3 | 3 | 3 | 3 |
| 18 | 1 | 1 | 3 | 3 | 3 |
| 19 | 1 | 2 | 3 | 3 | 3 |
| 20 | 1 | 3 | 3 | 3 | 3 |
| 21 | 1 | 1 | 3 | 3 | 3 |
| 22 | 1 | 2 | 3 | 3 | 3 |
| 23 | 1 | 3 | 3 | 3 | 3 |
| 24 | 1 | 1 | 3 | 3 | 3 |
| 25 | 1 | 2 | 3 | 3 | 3 |
| 26 | 1 | 3 | 3 | 3 | 3 |

Fig.11

| COUNT DATA DIFFERENCE VALUE SEQUENCE PATTERN | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| COUNT DATA DIFFERENCE VALUE SEQUENCE PATTERN [1] | 1 | 1 | 3 | 3 | 3 |
| COUNT DATA DIFFERENCE VALUE SEQUENCE PATTERN [2] | 1 | 2 | 3 | 3 | 3 |
| COUNT DATA DIFFERENCE VALUE SEQUENCE PATTERN [3] | 1 | 3 | 3 | 3 | 3 |

*Fig. 12*

| COUNT DATA ADDRESS SEQUENCE PATTERN | COUNT DATA DIFFERENCE VALUE SEQUENCE PATTERN |
|---|---|
| COUNT DATA ADDRESS SEQUENCE PATTERN [01] | COUNT DATA DIFFERENCE VALUE SEQUENCE PATTERN [1] |
| COUNT DATA ADDRESS SEQUENCE PATTERN [02] | COUNT DATA DIFFERENCE VALUE SEQUENCE PATTERN [3] |
| COUNT DATA ADDRESS SEQUENCE PATTERN [03] | COUNT DATA DIFFERENCE VALUE SEQUENCE PATTERN [2] |
| COUNT DATA ADDRESS SEQUENCE PATTERN [04] | COUNT DATA DIFFERENCE VALUE SEQUENCE PATTERN [1] |
| COUNT DATA ADDRESS SEQUENCE PATTERN [05] | COUNT DATA DIFFERENCE VALUE SEQUENCE PATTERN [3] |
| COUNT DATA ADDRESS SEQUENCE PATTERN [06] | COUNT DATA DIFFERENCE VALUE SEQUENCE PATTERN [2] |
| COUNT DATA ADDRESS SEQUENCE PATTERN [07] | COUNT DATA DIFFERENCE VALUE SEQUENCE PATTERN [1] |
| COUNT DATA ADDRESS SEQUENCE PATTERN [08] | COUNT DATA DIFFERENCE VALUE SEQUENCE PATTERN [3] |
| COUNT DATA ADDRESS SEQUENCE PATTERN [09] | COUNT DATA DIFFERENCE VALUE SEQUENCE PATTERN [2] |
| COUNT DATA ADDRESS SEQUENCE PATTERN [10] | COUNT DATA DIFFERENCE VALUE SEQUENCE PATTERN [1] |
| COUNT DATA ADDRESS SEQUENCE PATTERN [11] | COUNT DATA DIFFERENCE VALUE SEQUENCE PATTERN [3] |
| COUNT DATA ADDRESS SEQUENCE PATTERN [12] | COUNT DATA DIFFERENCE VALUE SEQUENCE PATTERN [2] |

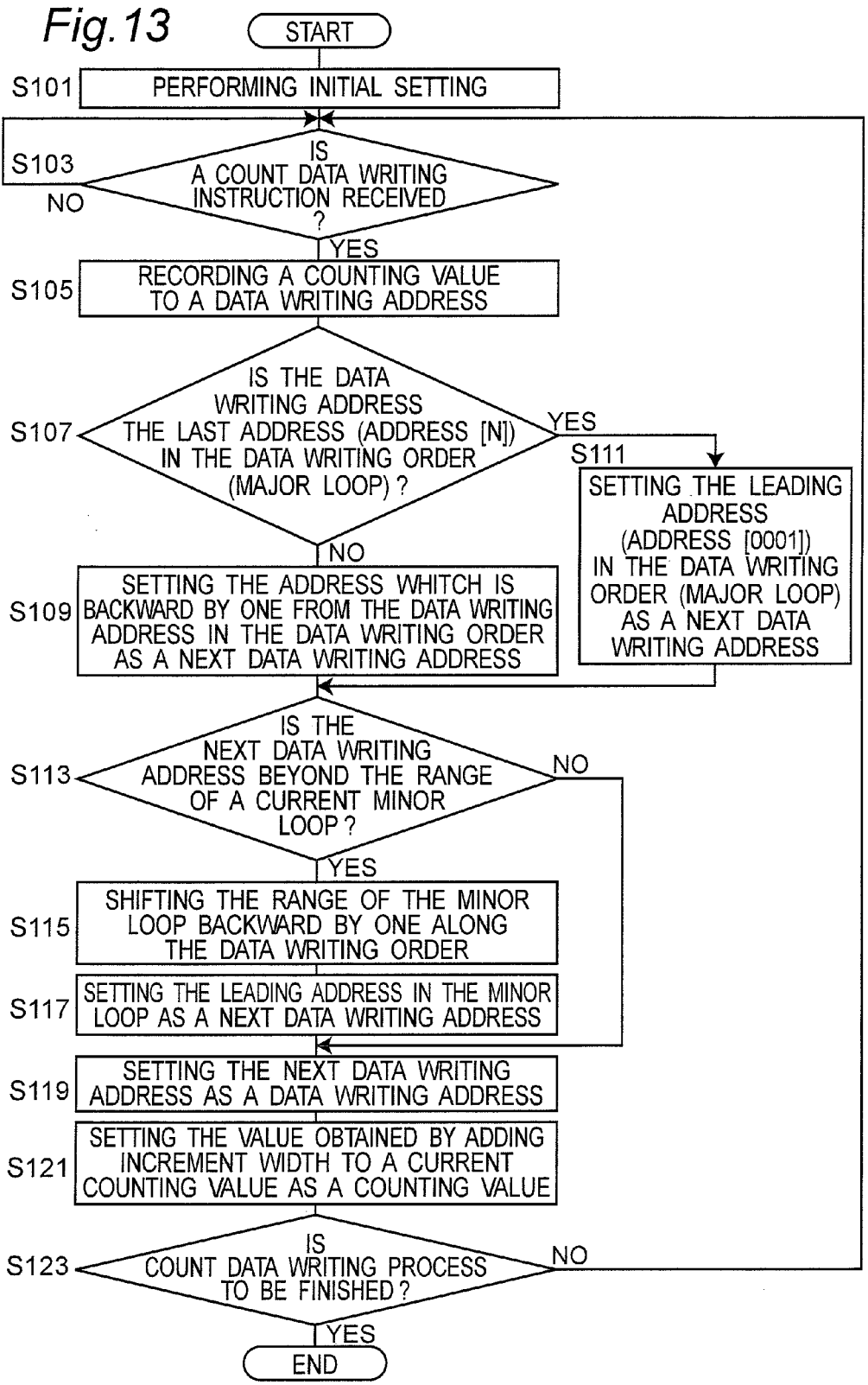

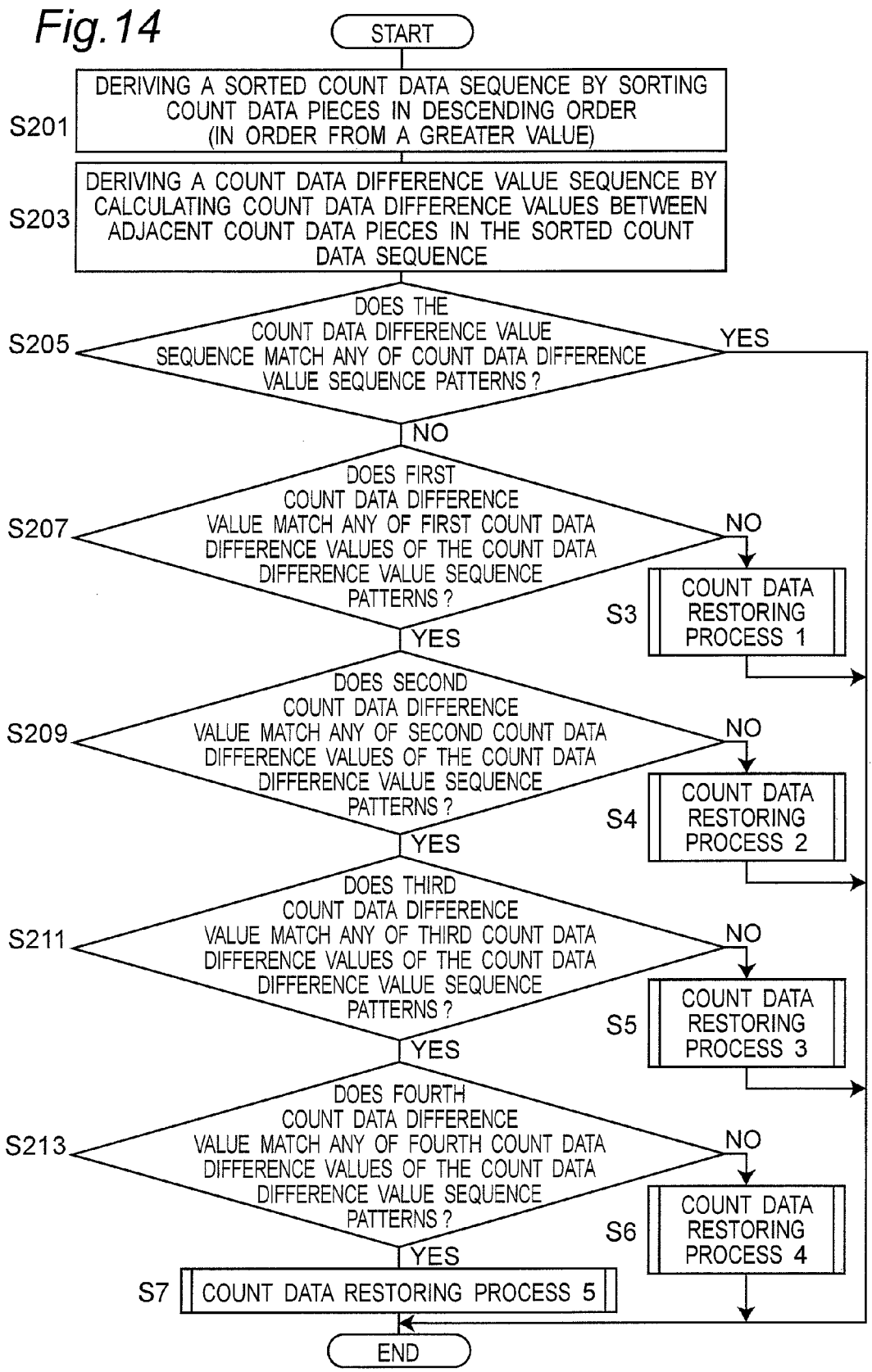

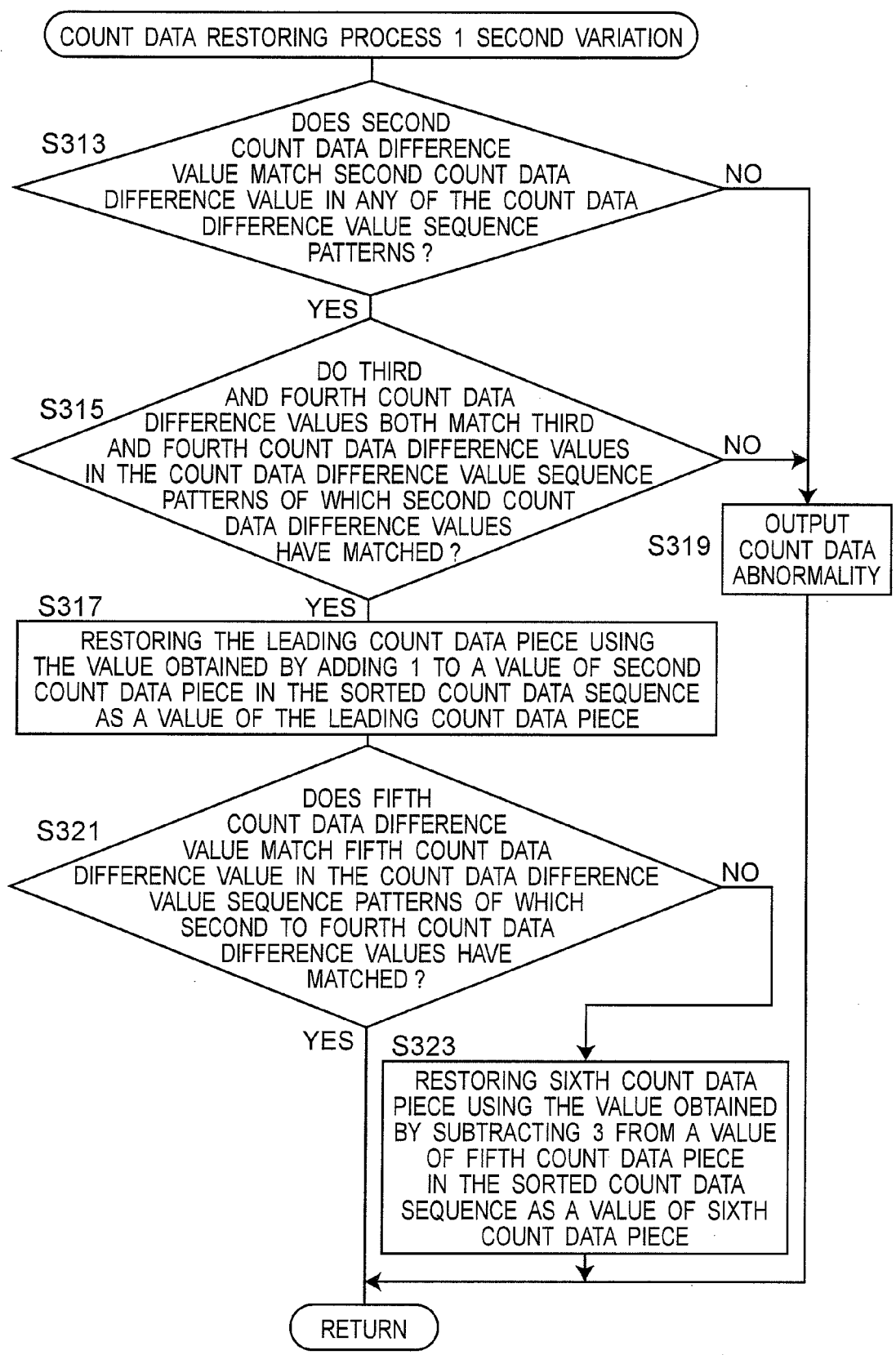

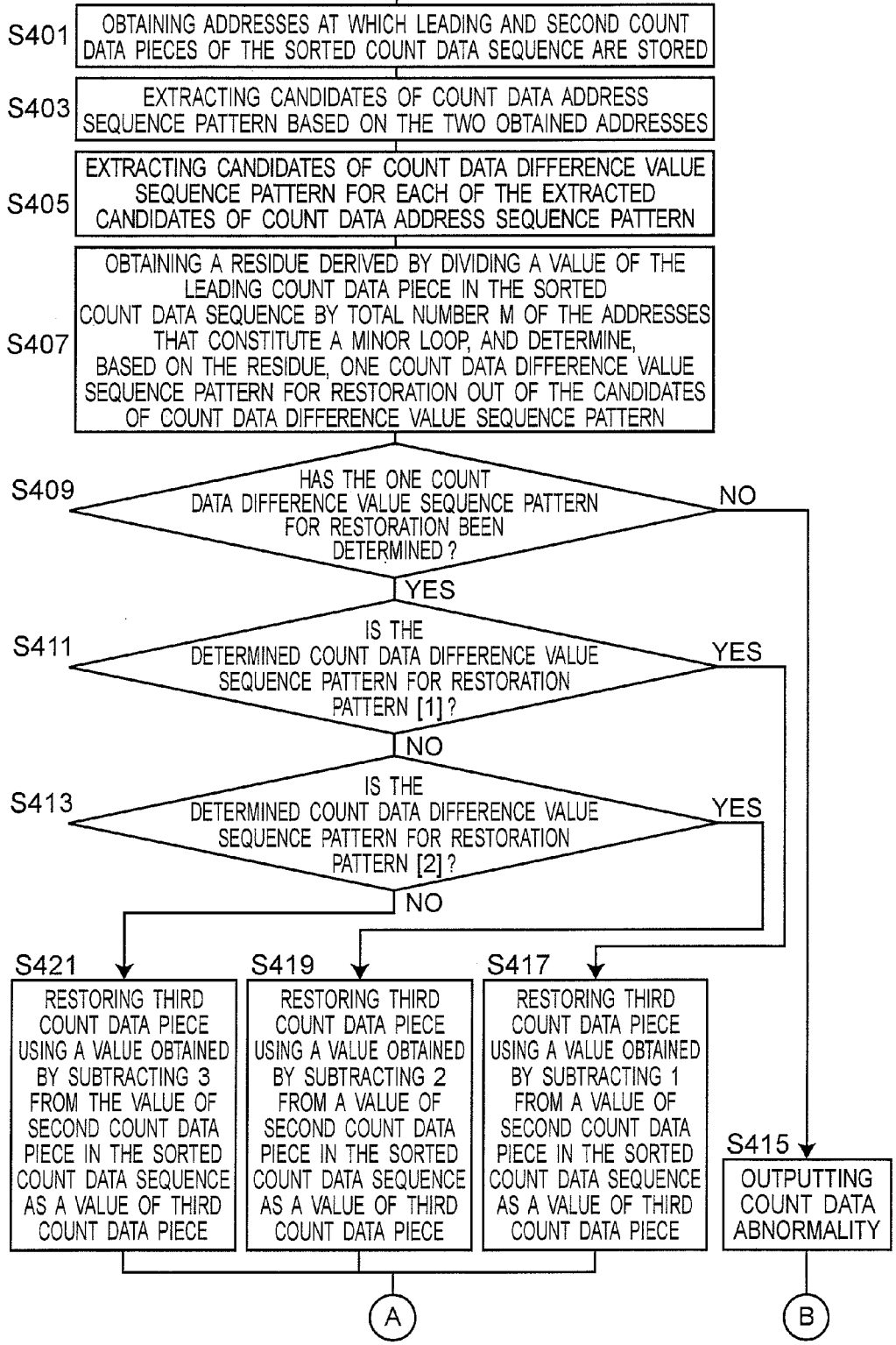

*Fig.22*

COUNT DATA EXAMPLE 1

| ADDRESS | COUNT DATA |
|---|---|
| ADDRESS [1] | 71 |
| ADDRESS [2] | 75 |
| ADDRESS [3] | 59 |
| ADDRESS [4] | 64 |
| ADDRESS [5] | 67 |
| ADDRESS [6] | 70 |

Fig.23

| SORTED COUNT DATA SEQUENCE | I | II | III | IV | V | VI |
|---|---|---|---|---|---|---|
| COUNT DATA | 75 | 71 | 70 | 67 | 64 | 59 |
| COUNT DATA ADDRESS | ADDRESS [2] | ADDRESS [1] | ADDRESS [6] | ADDRESS [5] | ADDRESS [4] | ADDRESS [3] |

Fig.24

| COUNT DATA DIFFERENCE VALUE | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| | 4 | 1 | 3 | 3 | 5 |

Fig.25

| I | II | III | IV | V | VI | COUNT DATA ADDRESS SEQUENCE PATTERN |
|---|---|---|---|---|---|---|
| ADDRESS [2] | ADDRESS [1] | ADDRESS [6] | ADDRESS [5] | ADDRESS [4] | ADDRESS [3] | COUNT DATA ADDRESS SEQUENCE PATTERN [1] |
| ADDRESS [2] | ADDRESS [3] | ADDRESS [1] | ADDRESS [6] | ADDRESS [5] | ADDRESS [4] | COUNT DATA ADDRESS SEQUENCE PATTERN [4] |

Fig.26

| COUNT DATA ADDRESS SEQUENCE PATTERN | COUNT DATA DIFFERENCE VALUE SEQUENCE PATTERN |
|---|---|
| COUNT DATA ADDRESS SEQUENCE PATTERN [1] | COUNT DATA DIFFERENCE VALUE SEQUENCE PATTERN [1] |
| | COUNT DATA DIFFERENCE VALUE SEQUENCE PATTERN [3] |
| COUNT DATA ADDRESS SEQUENCE PATTERN [4] | COUNT DATA DIFFERENCE VALUE SEQUENCE PATTERN [2] |

Fig.27

| SORTED COUNT DATA SEQUENCE | I | II | III | IV | V | VI |
|---|---|---|---|---|---|---|
| COUNT DATA BEFORE RESTORATION | 75 | 71 | 70 | 67 | 64 | 59 |
| COUNT DATA ADDRESS BEFORE RESTORATION | ADDRESS [2] | ADDRESS [1] | ADDRESS [6] | ADDRESS [5] | ADDRESS [4] | ADDRESS [3] |
| COUNT DATA AFTER RESTORATION | 75 | 74 | 73 | 70 | 67 | 64 |
| COUNT DATA ADDRESS AFTER RESTORATION | ADDRESS [2] | ADDRESS [1] | ADDRESS [6] | ADDRESS [5] | ADDRESS [4] | ADDRESS [3] |

Fig.28

| | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| COUNT DATA DIFFERENCE VALUE | 4 | 1 | 3 | 3 | 5 |

Fig.29

| COUNT DATA DIFFERENCE VALUE SEQUENCE PATTERN | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| COUNT DATA DIFFERENCE VALUE SEQUENCE PATTERN [1] | 1 | 1 | 3 | 3 | 3 |
| COUNT DATA DIFFERENCE VALUE SEQUENCE PATTERN [2] | 1 | 2 | 3 | 3 | 3 |
| COUNT DATA DIFFERENCE VALUE SEQUENCE PATTERN [3] | 1 | 3 | 3 | 3 | 3 |

Fig.30

| SORTED COUNT DATA SEQUENCE | I | II | III | IV | V | VI |
|---|---|---|---|---|---|---|
| COUNT DATA BEFORE RESTORATION | 75 | 71 | 70 | 67 | 64 | 59 |
| COUNT DATA ADDRESS BEFORE RESTORATION | ADDRESS [2] | ADDRESS [1] | ADDRESS [6] | ADDRESS [5] | ADDRESS [4] | ADDRESS [3] |
| COUNT DATA AFTER RESTORATION | 72 | 74 | 70 | 67 | 64 | 59 |
| COUNT DATA ADDRESS AFTER RESTORATION | ADDRESS [2] | ADDRESS [1] | ADDRESS [6] | ADDRESS [5] | ADDRESS [4] | ADDRESS [3] |

Fig.31

| SORTED COUNT DATA SEQUENCE | I | II | III | IV | V | VI |
|---|---|---|---|---|---|---|
| COUNT DATA BEFORE RESTORATION | 75 | 71 | 70 | 67 | 64 | 59 |
| COUNT DATA ADDRESS BEFORE RESTORATION | ADDRESS [2] | ADDRESS [1] | ADDRESS [6] | ADDRESS [5] | ADDRESS [4] | ADDRESS [3] |
| COUNT DATA AFTER RESTORATION | 72 | 71 | 70 | 67 | 64 | 61 |
| COUNT DATA ADDRESS AFTER RESTORATION | ADDRESS [2] | ADDRESS [1] | ADDRESS [6] | ADDRESS [5] | ADDRESS [4] | ADDRESS [3] |

Fig.32

COUNT DATA EXAMPLE 2

| ADDRESS | COUNT DATA |
|---|---|
| ADDRESS [1] | 53 |
| ADDRESS [2] | 40 |
| ADDRESS [3] | 43 |
| ADDRESS [4] | 46 |
| ADDRESS [5] | 49 |
| ADDRESS [6] | 52 |

Fig.33

| SORTED COUNT DATA SEQUENCE | I | II | III | IV | V | VI |
|---|---|---|---|---|---|---|
| COUNT DATA | 53 | 52 | 47 | 46 | 43 | 40 |
| COUNT DATA ADDRESS | ADDRESS [1] | ADDRESS [6] | ADDRESS [5] | ADDRESS [4] | ADDRESS [3] | ADDRESS [2] |

Fig.34

| | FIRST COUNT DATA DIFFERENCE VALUE | SECOND COUNT DATA DIFFERENCE VALUE | THIRD COUNT DATA DIFFERENCE VALUE | FOURTH COUNT DATA DIFFERENCE VALUE | FIFTH COUNT DATA DIFFERENCE VALUE |
|---|---|---|---|---|---|
| COUNT DATA DIFFERENCE VALUE | 1 | 5 | 1 | 3 | 3 |

Fig.35

| I | II | III | IV | V | VI | COUNT DATA ADDRESS SEQUENCE PATTERN |
|---|---|---|---|---|---|---|
| ADDRESS [1] | ADDRESS [6] | ADDRESS [5] | ADDRESS [4] | ADDRESS [3] | ADDRESS [2] | COUNT DATA ADDRESS SEQUENCE PATTERN [11] |

Fig.36

| COUNT DATA ADDRESS SEQUENCE PATTERN | COUNT DATA DIFFERENCE VALUE SEQUENCE PATTERN |  |
|---|---|---|
| | COUNT DATA DIFFERENCE VALUE SEQUENCE PATTERN [1] | COUNT DATA DIFFERENCE VALUE SEQUENCE PATTERN [3] |
| COUNT DATA ADDRESS SEQUENCE PATTERN [11] | | |

Fig.37

| SORTED COUNT DATA SEQUENCE | I | II | III | IV | V | VI |
|---|---|---|---|---|---|---|
| COUNT DATA BEFORE RESTORATION | 53 | 52 | 47 | 46 | 43 | 40 |
| COUNT DATA ADDRESS BEFORE RESTORATION | ADDRESS [1] | ADDRESS [6] | ADDRESS [5] | ADDRESS [4] | ADDRESS [3] | ADDRESS [2] |
| COUNT DATA AFTER RESTORATION | 53 | 52 | 49 | 46 | 43 | 40 |
| COUNT DATA ADDRESS AFTER RESTORATION | ADDRESS [1] | ADDRESS [6] | ADDRESS [5] | ADDRESS [4] | ADDRESS [3] | ADDRESS [2] |

COUNT DATA RECORDING DEVICE, AND METHOD AND PROGRAM FOR RECORDING COUNT DATA

This application is based on an application No. 2008-319326 filed in Japan, the contents of which are hereby incorporated by reference.

BACKGROUND OF THE INVENTION

1. Field of the Invention

The present invention relates to devices for recording count data in a memory area configured by such as a memory and methods of recording the count data, and in particular, to a count data recording device and a recording method capable of detecting a corruption occurred in the count data recorded in the memory area and correcting the corrupted count data that has been detected to restore normality.

2. Description of the Related Art

Conventionally, memories are used for recording and retaining data. In particular, a nonvolatile memory is typically used for a purpose of retaining data within the memory for an extended period of time. As used herein, the nonvolatile memory collectively means a memory that can retain stored information even when not powered.

However, the nonvolatile memory (for example, Electrically Erasable and Programmable Read Only Memory (EEPROM)) generally has poor write endurance. The write endurance of the nonvolatile memory varies depending on a type of the memory, but the number of rewrites is usually limited to on the order of 1,000,000 write cycles, for example.

The nonvolatile memory is used for recording a specific type of data in some cases. Examples of such a specific type of data include count data, which is used to record and count a number of times of some sort by incrementing a specific value by a predetermined value. If the predetermined value is negative, the count data expresses the number that is recorded as the specific value being sequentially decremented. The count data is used for, for example, recording a number of times that a specific device (such as a photoreceptor unit of an image processing device) has operated.

When recording such count data in a memory having relatively low write endurance, the count data is recorded in the memory in a following manner, and restored when the data is corrupted.

For example, when the count data is to be written for 3,000,000 times using a memory, a single address of which can be written to for 1,000,000 times, three addresses of the memory are used and pieces of the count data is written to the three addresses sequentially one by one. As the count data pieces are incremented (or decremented) by a predetermined value, three values that are incremented (or decremented) by the predetermined value to each other are respectively recorded to the three addresses.

As the count data pieces are naturally incremented (or decremented) by a predetermined value, even when one of the recorded count data pieces is corrupted, it is possible to restore the corrupted count data piece by obtaining a value by adding (or subtracting) either the predetermined value or a value twice as large as the predetermined value to a value of another count data piece that is not corrupted, and by writing the obtained value to an address of the corrupted count data piece.

As described above, by using a memory, a single address of which can be written for 1,000,000 times, the count data can be written and restored for 3,000,000 times using three addresses.

Further, there is an example in which 3,500,000 write cycles of the count data is realized using a memory, a single address of which can be written for 1,000,000 write cycles, in the following manner.

First, count data pieces are written to three addresses sequentially one by one, in the same manner as the previous example, up to a predetermined number of times (for example, 970,000 times). Subsequently, unlike the previous example, the count data pieces are written to different three addresses that are different from the previous three addresses sequentially one by one.

According to such a method, in order to realize 3,500,000 write cycles of the count data, total ten addresses are necessary including the six addresses to which the count data pieces are written, three addresses each retaining a number of times of writing to each of the three addresses, and a single address that retains data indicating which address group between a group of the three addresses and a group of the different three addresses is used to write the count data pieces.

Theoretically, only four addresses, to each of which data can be written for 1,000,000 times are sufficient for the recording of the count data pieces for 3,500,000 write cycles. Nevertheless, the count data pieces are recorded (and the corrupted count data piece is restored) using ten addresses according to the above conventional example. This is undesirable in terms of from an aspect of use efficiency of a memory.

Further, examples of the conventional technique for detecting an error in recorded data and restoring the error include techniques disclosed in patent documents described below.

JP 7-078232 A discloses a counter device for recording count data. The counter device according to JP 7-078232 A is provided with a control unit, and a plurality of sub-counters to which initial values that are a plurality of continuous values are set, respectively. When counting up, the control unit of the counter device determines whether a largest value and a second largest value among values retained in the plurality of sub-counters are continuous. If it is determined not to be continuous, the control unit rewrites the value of the sub-counter retaining a smallest value to a value obtained by adding two to a second largest value and sets the rewritten value as a counting value. Alternatively, if it is determined to be continuous, the control unit rewrites the value of the sub-counter retaining the smallest value to a value obtained by adding one to a largest value and sets the rewritten value as a counting value. As described above, focusing on continuity of values retained in the plurality of sub-counters, the counter device according to JP 7-078232 A determines whether or not the value retained in each sub-counter is proper and restores an error in the counting value using a value that is determined to be proper.

JP 2000-172133 A discloses a life time management device for image forming devices capable of storing information expressing a rate of usage of a replaceable unit mounted to an image forming device. The device according to JP 2000-172133 A is provided with a nonvolatile memory that stores the information expressing the rate of usage of the replaceable unit, a writing unit that writes the information expressing the rate of usage of the replaceable unit to the nonvolatile memory, and a restoration unit that detects and restores the erroneous information written to the nonvolatile memory. Further, the nonvolatile memory is provided with three or more areas each storing the information expressing the rate of usage of the replaceable unit. When writing the information expressing the rate of usage of the replaceable unit, the writing unit of the life time management device writes the information expressing the rate of usage of the replaceable unit of the same content to each of the three or more areas. Then, the restoration unit of the life time management device determines whether or not pieces of the information written respectively to the three or more areas are identical. When it is determined to be not identical, the restoration unit carries out a restoration process so that the pieces of information written respectively to the three or more areas are identical. As described above, focusing on the sameness of information written in the plurality of memory areas, the life time management device for image forming devices according to JP 2000-172133 A detects erroneous information and restores the erroneous information to restore proper information.

As described above, a number of techniques have been proposed for recording count data and such, and correcting a erroneous count data piece and such accordingly to restore a proper data piece.

SUMMARY OF THE INVENTION

It is an object of the present invention to provide a count data recording device provided having a memory with improved use efficiency, from a viewpoint of relative use efficiency with respect to write endurance of the memory and a countable number of times, and capable of restoring a count data piece that has been corrupted.

According to one aspect of the present invention, there is provided a count data recording device which records count data pieces in memory areas, the count data pieces representing counting values which vary monotonously at a predetermined width from a predetermined value. The count data recording device includes: a storage unit that includes N memory areas respectively storing the count data pieces, where N is an integer equal to or greater than 4; a data writing unit that writes a count data piece to the storage unit; a data reading unit that reads the count data piece from the storage unit; and a data restoring unit that detects a corruption in the count data pieces stored in the storage unit and restores the corruption, wherein the data writing unit records the count data piece in the storage unit by: defining a range of a minor loop by selecting M memory areas out of the N memory areas according to a predetermined order, where M is an integer equal to or greater than 3 and smaller than N, the predetermined order defining an order of the memory areas used for recording the count data pieces; recording the count data piece using the memory area included in the range of the minor loop according to the predetermined order; and shifting the range of the minor loop backward according to the predetermined order after recording the count data piece using a last memory area within the range of the minor loop and setting a new range of the minor loop, and wherein the data restoring unit: derives a sorted count data sequence by sorting count data pieces in the N memory areas so that values of the count data pieces vary monotonously; derives a count data difference value sequence by obtaining difference values between adjacent count data pieces in the sorted count data sequence; and detects and restores the corruption in the count data pieces stored in the N memory areas based on the sorted count data sequence and the count data difference value sequence.

According to another aspect of the present invention, there is provided a method for recording count data using a count data recording device which records count data pieces in memory areas, the count data pieces representing counting values which vary monotonously at a predetermined width from a predetermined value. The method includes: defining a range of a minor loop by selecting M memory areas out of N memory areas according to a predetermined order, where N is an integer equal to or greater than 4 and M is an integer equal to or greater than 3 and smaller than N, the N memory areas being included in a storage unit and respectively storing the count data piece by a data writing unit, the predetermined order defining an order of the memory areas used for recording the count data pieces; recording the count data piece using the memory area included in the range of the minor loop according to the predetermined order by the data writing unit; shifting the range of the minor loop backward according to the predetermined order after recording the count data piece using a last memory area within the range of the minor loop and setting a new range of the minor loop by the data writing unit; deriving a sorted count data sequence by sorting the count data pieces in the N memory areas so that values of the count data pieces vary monotonously by a data restoring unit; deriving a count data difference value sequence by obtaining difference values between adjacent count data pieces in the sorted count data sequence by the data restoring unit; and detecting and restoring a corruption in the count data pieces stored in the N memory areas based on the sorted count data sequence and the count data difference value sequence by the data restoring unit.

According to still another aspect of the present invention, there is provided a computer-readable medium having stored thereon computer executable instructions. The instructions, when executed by a computer of a count data recording device for recording count data, the count data recording device recording count data pieces in memory areas, the count data pieces representing counting values that change monotonously at a predetermined width from a predetermined value, performs: causing a data writing unit to define a range of a minor loop by selecting M memory areas out of N memory areas according to a predetermined order, where N is an integer equal to or greater than 4 and M is an integer equal to or greater than 3 and smaller than N, the N memory areas being included in a storage unit and respectively storing the count data pieces, the predetermined order defining an order of the memory areas used for recording the count data pieces; causing the data writing unit to record the count data piece using the memory area included in the range of the minor loop according to the predetermined order; causing the data writing unit to shift the range of the minor loop backward according to the predetermined order after recording the count data piece using a last memory area within the range of the minor loop and to set a new range of the minor loop;

causing a data restoring unit to derive a sorted count data sequence by sorting the count data pieces in the N memory areas so that values of the count data pieces vary monotonously; causing the data restoring unit to derive a count data difference value sequence by obtaining difference values between adjacent count data pieces in the sorted count data sequence; and causing the data restoring unit to detect and restore a corruption in the count data pieces stored in the N memory areas based on the sorted count data sequence and the count data difference value sequence.

A count data recording device and a method for recording count data according to the present invention is advantageous for its improved memory use efficiency from viewpoint of relative use efficiency with respect to write endurance of the memory and a countable number of times, and is capable of, when a count data piece recorded in the memory is corrupted, correcting the corrupted count data piece to restore a proper count data piece.

BRIEF DESCRIPTION OF THE DRAWINGS

The above and further objects and novel features of the invention will more fully appear from the following detailed description when the same is read in connection with the accompanying drawings, and in which:

FIG. 6 is a diagram illustrating a specific example of count data writing, where a total number N of memory areas that constitute a major loop is 6, a total number M of memory areas that constitute a minor loop is 3, a count incremental width L is 1, and a count start value C is 1;

FIG. 7 is a diagram of a correspondence between sorted count data sequences and count data address sequence patterns appeared when proper count data pieces are sorted by their values in descending order;

FIG. 8 is a diagram of a correspondence between sorted count data sequences and the count data address sequence patterns;

FIG. 9 is a diagram of a correspondence between sorted count data sequences and count data difference value sequence patterns;

FIG. 10 is a diagram of count data difference values from count numbers 0 to 26, where (N, M, L, C)=(6, 3, 1, 1);

FIG. 11 is a diagram of details of the count data difference value sequence patterns, where (N, M, L)=(6, 3, 1);

FIG. 12 is a diagram of a correspondence between the count data address sequence patterns and the count data difference value sequence patterns, where (N, M, L)=(6, 3, 1);

FIG. 13 is a flowchart of a count data writing process;

FIG. 14 is a flowchart of a count data restoring process;

FIG. 17 is a detailed flowchart of a count data restoring process 1 second variation;

FIGS. 18A and 18B are detailed flowcharts of a count data restoring process 2;

FIG. 22 is a diagram of count data pieces used in a count data restoring process first execution example;

FIG. 23 is a detailed diagram of a sorted count data sequence;

FIG. 24 is a diagram of a count data difference value sequence of the sorted count data sequence;

FIG. 25 is a diagram of count data address sequence patterns having an address [2] as a leading address;

FIG. 26 is a diagram of count data difference value sequence patterns respectively corresponding to extracted candidates of the count data address sequence patterns;

FIG. 27 is a diagram of values of the count data pieces before and after restoration;

FIG. 28 is a diagram of a count data difference value sequence for the sorted count data sequence;

FIG. 29 is a diagram of the count data difference value sequence patterns;

FIG. 30 is a diagram of the sorted count data sequence in which a leading count data piece in the sorted count data sequence is restored;

FIG. 31 is a diagram of the sorted count data sequence in which a sixth count data piece in the sorted count data sequence is restored;

FIG. 32 is a diagram of count data pieces used in a count data restoring process second execution example;

FIG. 33 is a detailed diagram of a sorted count data sequence;

FIG. 34 is a diagram of a count data difference value sequence for the sorted count data sequence;

FIG. 35 is a diagram of a count data address sequence pattern having an address [1] as a leading address of and an address [6] as a second address;

FIG. 36 is a diagram of count data difference value sequence patterns corresponding to an extracted candidate of the count data address sequence pattern; and FIG. 37 is a diagram of the sorted count data sequence in which a third count data piece in the sorted count data sequence is restored.

Figure 1:
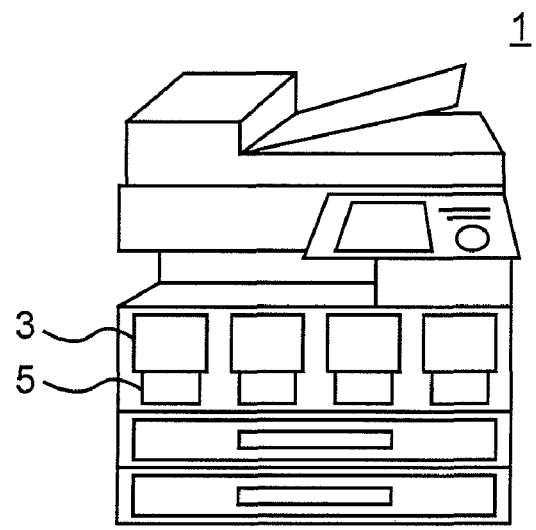
FIG. 1 is a perspective view of a count data recording device (MFP 1) according to an embodiment of the present invention.

It is to be expressly understood, however, that the drawings are for the purpose of illustration only and are not intended as definitions of the limits of the invention. Preferred embodiments of the present invention are described in more detail below referring to these accompanying drawings.

DETAILED DESCRIPTION OF THE PREFERRED EMBODIMENTS

A count data recording device according to an embodiment of the present invention is capable of recording count data exceeding the write endurance of its storage device. The count data recording device is provided with N memory areas each capable of storing a count data piece (N is an integer equal to or greater than 4). The count data recording device records the count data piece that increases (if L is positive) or decreases (if L is negative) monotonously by an incremental width L (where L is a number other than 0) from a count start value C (C is an arbitrary number). The count data recording device changes a memory area to be used next according to a predetermined order every time it records the count data piece. The count data recording device cyclically uses the N memory areas, in a manner such that, when the count data piece has been recorded using an N-th memory area in the predetermined order and when the count data recording device next records the count data piece, the count data piece is recorded using a first memory area in the predetermined order as a general rule. As used herein, a memory area cycle of the N memory areas used for recording the count data piece is referred to as a "major loop." Further, the count data recording device according to the embodiment of the present invention has another loop that is included within the "major loop" as described above, in which memory areas to be used for the count data recording is locally cycled according to the predetermined order. As used herein, the other cycle of memory areas within the major loop is referred to as a "minor loop." The "minor loop" includes M memory areas (M is an integer equal to or greater than 3 and smaller than N), and the count data recording device changes a memory area to be used next in turn in the minor loop every time it records the count data piece. Then, when the count data piece has been recorded using an M-th memory area in a minor loop and when the count data recording device next records the count data piece, a range of the M memory areas that constitute the minor loop is shifted backward by one according to the predetermined order in the major loop thereby setting a new range of a minor loop, and the count data piece is recorded using a first memory area in the new minor loop. For example, when a first range of the minor loop is constituted by memory areas of first to M-th memory areas in the major loop, M memory areas of second to (M+1)th memory areas in the major loop constitute a new range of the minor loop after the count data piece has been recorded using the M-th memory area, and the count data piece is next recorded in the second memory area in the major loop. In a case in which the range of the minor loop would go beyond the N-th memory area in the major loop, the range of the minor loop includes memory areas starting again from the first memory area in the major loop according to the predetermined order of the major loop and to a cycling rule.

Further, the count data recording device according to the embodiment of the present invention detects a corruption in the count data pieces and restores the detected corruption. The count data recording device according to the embodiment of the present invention detects a corruption in the count data pieces and restores the detected corruption based on a principle as described below. By recording the count data pieces in the above described manner, a count data sequence obtained by sorting the count data pieces recorded in the N memory areas so as to vary monotonously according to values of the count data pieces (either in descending order when the incremental width L is positive or in ascending order when the incremental width L is negative) (sorted count data sequence) matches one of a finite number of patterns (count data address sequence patterns). Further, a numeric sequence constituted by difference values between values of the adjacent count data pieces in the sorted count data sequence (count data difference value sequence) also matches one of a finite number of patterns (count data difference value sequence patterns). Furthermore, there is only at most a predictable finite number of possible correspondence with count data difference value sequence patterns for an arbitrary count data address sequence pattern. Accordingly, whether the recorded count data pieces are actually normal or include a corruption can be determined based on whether or not the sorted count data sequence obtained by sorting the count data pieces by the values of the count data pieces and the count data difference value sequence for the sorted count data sequence match any one of the count data address sequence patterns as well as the count data difference value sequence pattern that corresponds to the any one of count data address sequence pattern. Based on the principle as described above, the count data recording device according to the embodiment of the present invention detects the corruption in the count data pieces. Further, when a corruption is detected in the count data pieces, the count data recording device according to the embodiment of the present invention, for example, a count data piece positioned at a predetermined order in the sorted count data sequence is assumed to be a normal count data piece and restores a count data piece based on the count data piece which is assumed to be normal, a predetermined count data address sequence pattern and a count data difference value sequence pattern.

As described above, the count data recording device according to the embodiment of the present invention is capable of recording count data for a number of times over the write endurance of its memory areas, and detecting and restoring corruption in the count data.

(Configuration of Count Data Recording Device)

FIG. 1 is a perspective view of a count data recording device according to an embodiment of the present invention. In this embodiment, the count data recording device is configured as a digital multi-functional peripheral (MFP) 1. The MFP 1 is a so-called image forming device, and provided with a toner cartridge 3 and a photoreceptor unit 5 therein for image forming.

Figure 2:
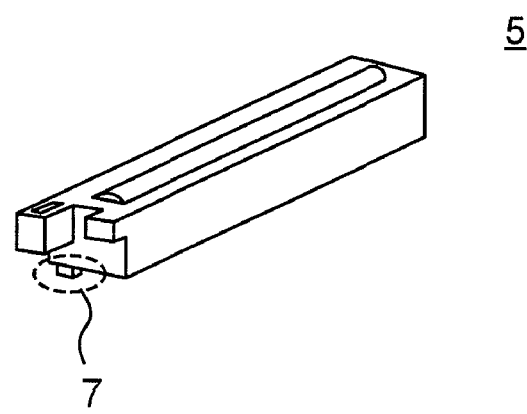
FIG. 2 is a perspective view of a photoreceptor unit 5.

FIG. 2 is a perspective view of the photoreceptor unit 5. The photoreceptor unit 5 is provided with a storage device 7 for recording count data pieces which is used for counting a number of times that the photoreceptor unit is used. A number of times of writing data to a memory area of the storage device 7 is prescribed, and writing data to the storage device 7 exceeding the prescribed number of times of writing would possibly spoil stability of data recording.

Figure 3:
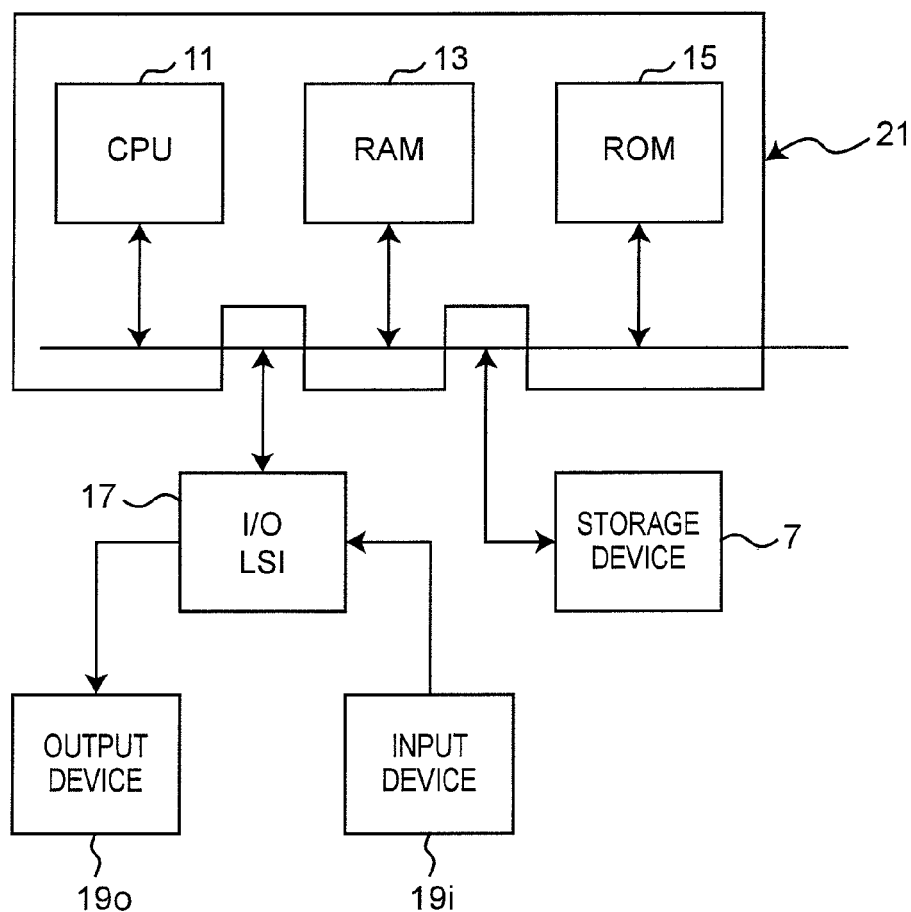
FIG. 3 is a block diagram of a hardware configuration of MFP 1.

FIG. 3 is a block diagram of a hardware configuration of the MFP 1, which forms a count data recording device according to the embodiment of the present invention. The MFP 1 is provided with a central processing unit (CPU) 11 that controls data processing and an overall operation of the device, a random access memory (RAM) 13 that retains a program and data, and a read-only memory (ROM) 15 that retains a program and data, all of which are connected by a data bus, thereby structuring a computer 21 in the MFP 1. The computer 21 serves as a count data recording device by executing a program for recording count data.

Further, the computer 21 of MFP 1 is connected to the storage device 7 for recording count data pieces and an I/O LSI 17 for sending and receiving data to and from various devices. The computer 21 is connected to an output device 19o and an input device 19i via the I/O LSI 17.

Figure 4:
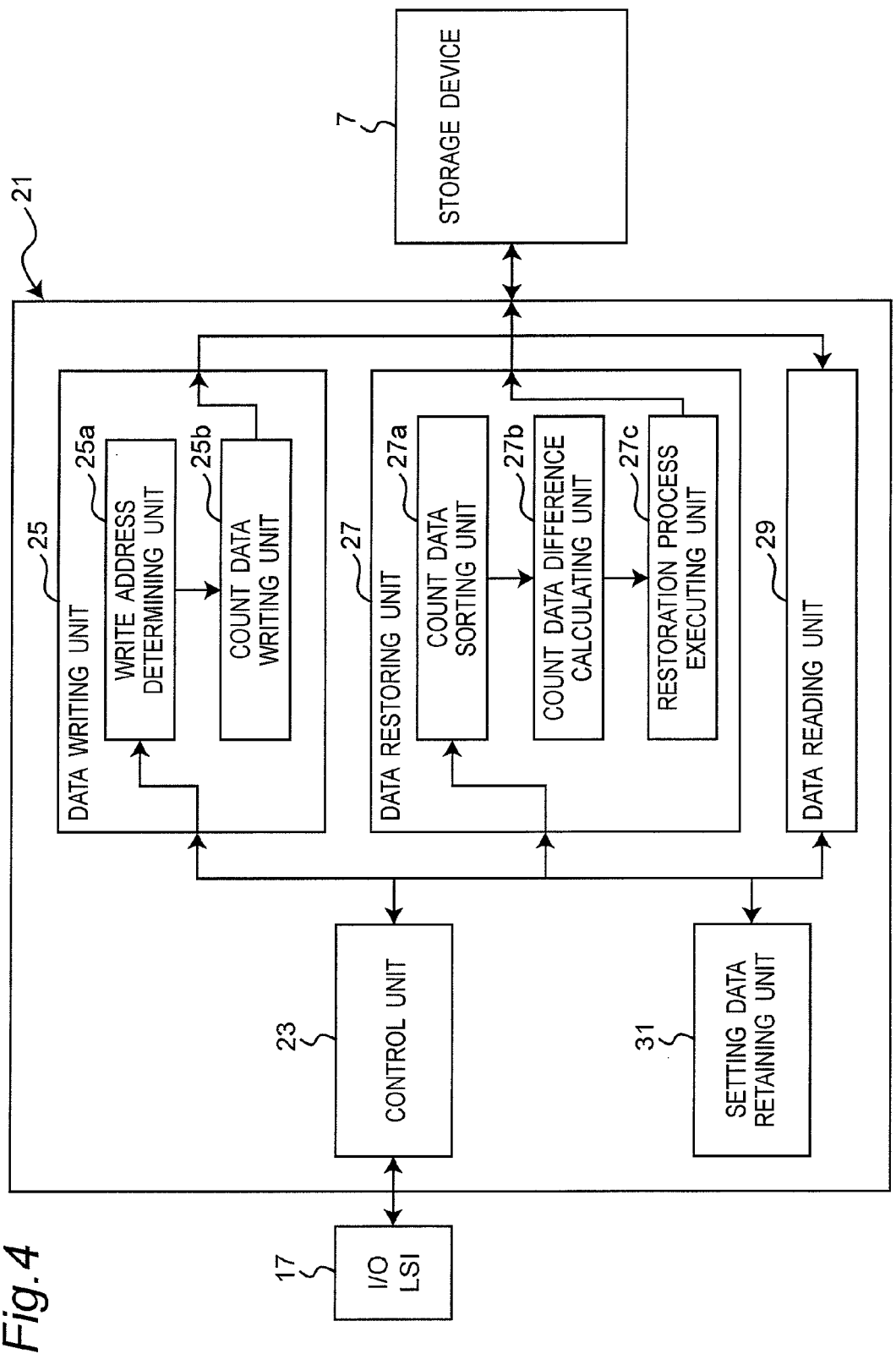
FIG. 4 is a block diagram of a functional configuration of MFP 1.

FIG. 4 is a functional block diagram of the MFP 1, which realizes functionality of the count data recording device according to the embodiment of the present invention. The computer 21 realizes the functions shown in the Figure by executing a program for recording count data.

The computer 21 serves as: a control unit 23 that controls each of the functional blocks; a data writing unit 25 that writes data to a predetermined address (memory area) of the storage device 7; a data restoring unit 27 that detects a corruption in the count data pieces recorded in the storage device 7 and restores the corruption, a data reading unit 29 that reads, from the storage device 7; the data recorded in the predetermined address (memory area); and a setting data retaining unit 31 that retains setting data necessary for executing the program for recording count data.

The data writing unit 25 is provided with: a write address determining unit 25a that determines an address (memory area) to which a count data piece is written by referring to the setting data retained in the setting data retaining unit 31 and such; and a count data writing unit 25b that writes count data piece to the determined address (memory area).

The data restoring unit 27 is provided with: a count data sorting unit 27a that sorts a plurality of count data pieces recorded in and read by the data reading unit 29 from predetermined addresses (memory areas) in a predetermined order (descending order or ascending order) and outputs a result of the sorting (sorted count data sequence); a count data difference calculating unit 27b that calculates differences (count data difference value sequence) between adjacent count data pieces in the result of the sorting by the count data sorting unit 27a (sorted count data sequence); and a restoration process executing unit 27c that detects a corruption of the count data piece and restores the detected corruption based on the sorted count data sequence, the count data difference value sequence pattern, and a value(s) of the count data piece(s) at a predetermined ordered position(s) in the sorted count data sequence.

The restoration process executing unit 27c carries out a process of detecting a data corruption, and a process of restoring the detected data corruption.

In the process of detecting the data corruption, the count data piece whose data is corrupted is specified by comparing an order of the addresses (memory areas) in the sorted count data sequence, an order of values in the count data difference value sequence for the sorted count data sequence, and a value(s) of the count data piece(s) at a predetermined ordered position(s) in the sorted count data sequence, with a combination(s) between a possible sequence(s) of the count data pieces (count data address sequence pattern(s)) when normal count data pieces (not including data corruption) are sorted as described above, and a corresponding sequence(s) of the difference values between values of adjacent count data pieces in each of the count data address sequence pattern(s) (count data difference value sequence pattern(s)). The combination(s) of the possible count data address sequence pattern(s) and count data difference value sequence pattern(s) for the normal count data pieces can be previously obtained before the process of detecting the data corruption is carried out, and retained in the device. The number of each of the count data address sequence patterns and the count data difference value sequence patterns varies depending on the number of addresses used for recording the count data pieces (the total number N of the addresses that configure the major loop) and the total number M of the addresses that configure the minor loop. In any case, the patterns are retainable since each of the number is only a finite number at most.

In the process of restoring a data corruption, the restoration process executing unit 27c obtains a normal count data value for the count data piece which includes a corruption being detected in the process of detecting a data corruption according to the count data address sequence pattern(s) and the count data difference value sequence pattern(s) as well as the value(s) of the count data piece at the predetermined ordered position(s) in the sorted count data sequence, and outputs restoration instructions, and the count data writing unit 25b of the data writing unit 25 writes a normal count data value to the concerning memory area based on the instruction.

The setting data retaining unit 31 retains such as the plurality of addresses of the storage device 7 provided for recording the count data pieces, an order according to which the writing of the count data pieces to the addresses is carried out, the total number of the addresses (the total number N of addresses constituting the major loop), the total number M of addresses constituting the minor loop, the incremental width L of the count data pieces, the count start value C, and the like.

(Structure of Data Retained by Storage Device 7)

Figure 5:
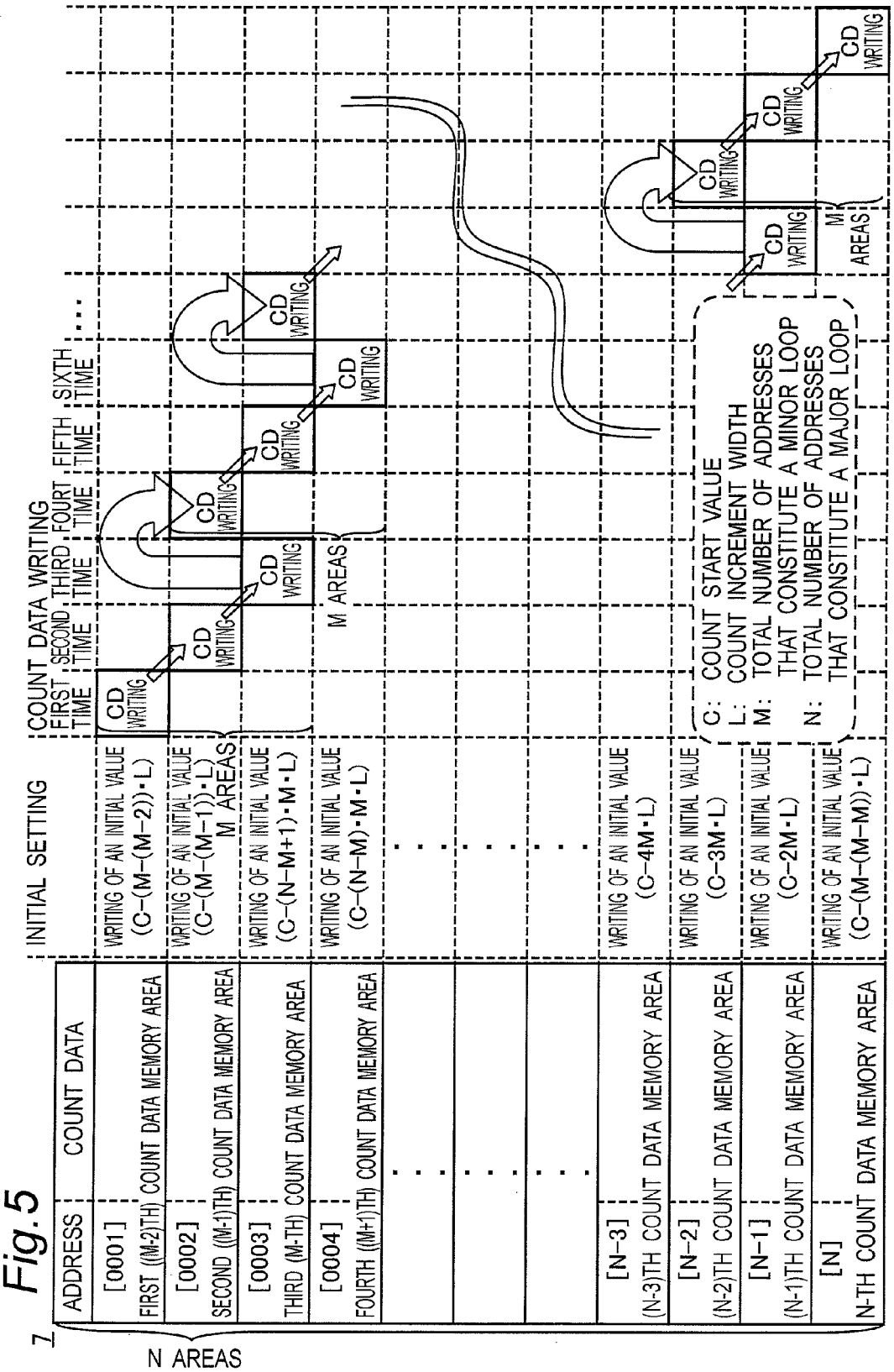
FIG. 5 is a schematic diagram illustrating a configuration of count data memory areas and an order of writing count data pieces according to the embodiment of the present invention.

FIG. 5 is a schematic diagram illustrating an order of the addresses of plural memory areas in the storage device 7 to be used when the count data pieces are written.

An address is generally referred to as an identifier that specifies a location of a target to be processed in information processing. In this specification, the address includes identifier for specifying a memory area in the storage device 7.

In this description, a memory area specified by a single address has a sufficient width in bits for retaining a count data piece. However, the present invention does not exclude the case where a single count data piece is recorded using memory areas specified by a plurality of addresses.

If a memory capacity of a storing position specified by a single address is smaller than a necessary capacity required for storing a single count data piece, the single count data piece can be divided and stored in a plurality of storing positions specified by a plurality of addresses. In this case, the count data recording device according to the embodiment of the present invention is only required to retain information of a combination of the plurality of memory areas to which the single count data piece is written, and information of an order of writing the count data piece in such memory areas.

On a left side in FIG. 5, N memory areas (N is a positive number equal to or greater than 4) are shown. The N memory areas constitute the major loop according to the embodiment of the present invention. As described above, the order of writing the count data pieces is previously specified for the N memory areas. This order is expressed in the drawing by modifiers such as first, second, . . . (N−1)th, and N-th.

Further, as described above, according to the embodiment of the present invention, the minor loop constituted by the M memory areas is provided within the major loop. The total number of addresses (memory areas) that constitute the minor loop may be M. As used herein, M may be a natural number that is equal to or greater than 3 and smaller than N. The diagram is depicted taking M=3 as an example.

Now, the order of writing the count data pieces is described. First, the count data recording device executes initial setting only when it is firstly activated. In the initial setting, initial values are written to first to N-th memory areas.

In the initial setting, each of the initial values written to the first to N-th memory areas are preferably as described below. However, the writing of the initial values is not essential in the embodiment of the present invention. In the embodiment of the present invention, even when the writing of the initial valued str not carried out, it is possible to detect a corruption (abnormality) in the count data pieces and restore the abnormality when the count data piece is written to each memory area from the first to the N-th memory areas at least once. The initial value of the count data piece is preferably $C-(M-i)\times L$ for an i-th memory area ($1<=i<M$), and $C-(N-i+1)\times M\times L$ for i-th memory area ($M<=i<=N$), where (C, L, M, N) is (count start value, count incremental width, total number of addresses that constitute the minor loop, total number of addresses that constitute the major loop).

In the first count data piece writing, the count data piece (count start value C) is written to the first memory area ("CD" in the drawing represents the count data piece).

In the second count data piece writing, the count data piece (count start value+count incremental width=$C+L$) is written to the second memory area.

In the third count data piece writing, the count data piece ($C+2\times L$) is written to the third memory area.

In the example of the figure where the total number M of addresses constituting the minor loop is 3, the range of the minor loop is shifted backward by one according to the order of the addresses, and the second, third, and fourth memory areas are set to constitute a new range of the minor loop before carrying out fourth count data piece writing. Then, in the fourth count data piece writing, the count data piece ($C+3\times L$) is written to the second memory area.

In this manner, fifth and sixth count data piece writing are carried out to the third and fourth memory areas, respectively. Thereafter, the range of the minor loop is shifted backward by one in the same manner as described above. Then, seventh count data piece writing is carried out to the third memory area.

As described above, after writing to the last memory area in the major loop (N-th memory area), the count data piece is again written to the first memory area in turn according to the order from the first memory area. The range of the minor loop is also set so as to include the memory areas starting again from the first memory area, if the range of the minor loop would go beyond the N-th memory area in the major loop.

In this manner, the count data recording device records the count data pieces by determining the address to which the count data piece is written (by the write address determining unit 25a) and by recording the count data piece to the memory area specified by this address (by the count data writing unit 25b). It would be appreciated by a person skilled in the art that, when the plurality of memory areas are used cyclically to record the count data pieces in the above described manner, the count data recording device according to the embodiment of the present invention is allowed to record the count data pieces for R×N times using the addresses of the total number N that constitute the major loop where N is an integer equal to or greater than 4, assuming that an allowable number of times of writing to each memory area is R (times) (where R is an natural number). Therefore, when recording the count data pieces by the incremental width L from a counting value C to a counting value Cmax, it is sufficient that the addresses of at least a natural number equal to or greater than (((Cmax−Cmin)/L)+1)/R are available. From the viewpoint of efficiency in use of the memory areas of the storage device 7, it is advantageous that the addresses of a smallest natural number equal to or greater than (((Cmax−Cmin+1)/L)+1)/R are available.

FIG. 6 is a diagram illustrating the progress of values of the count data pieces retained in each memory area in the example in which the count data writing is carried out for 26 times, where the count start value C is 1, the count incremental width L=+1, the total number M of the addresses that constitute the minor loop is 3, and the total number N of the addresses that constitute the major loop is 6. In this figure, an i-th memory area is expressed as an address [i] (i: an integer, 1<=i<=6). Further, hatched portions represent memory areas to each of which the count data piece is to be written in the corresponding count data writing.

Next, focusing on the values of the count data pieces, the count data pieces that are written to the respective memory areas (first to sixth memory areas) in this manner are sorted in descending order from a greater value. In the embodiment of the present invention, when the count incremental width L is negative, the count data pieces are sorted in ascending order from a smaller value.

FIG. 7 is a diagram illustrating sequences of the memory areas when sorting the counting values (values of the count data pieces) for respective counting in descending order. In the drawing, I to VI respectively represent an order of the count data pieces from a head of each sequence of the sorted count data pieces (sorted count data sequence).

As described above, there are 12 order patterns for the sorted count data sequence from a pattern [01] to a pattern [12], and any other ordered pattern does not exist when the count data pieces are normal. As used herein, these patterns of the order are referred to as count data address sequence patterns. Further, a total number of combinations can be expressed as N×(M−1) using the total number N of the addresses that constitute the major loop and the total number M of the addresses that constitute the minor loop. As described above, there are only a finite number of the count data address sequence patterns for an arbitrary combination of (M, N).

FIG. 8 is an organized diagram of the count data address sequence patterns. As shown in this diagram, when (M, N)=(3, 6), there are 12 count data address sequence patterns from pattern [01] to pattern [12].

Next, sequences of difference values between values of the adjacent count data pieces in the sorted count data sequence and the count data address sequence patterns are described.

FIG. 9 is a diagram illustrating difference value sequences that are possible for the normal count data pieces with the arbitrary (M, N). For the sake of simplicity, in the figure, the count incremental width L is taken as +1. The arbitrary L is omitted from the drawing, as the person skilled in the art would know easily based on the figure.

When the total number of the addresses that constitute the major loop is N, the total number of the difference values is (N−1). In the sorted count data sequence in which the count data pieces are sorted in descending order (or ascending order), a difference value between a value of the leading (first) count data piece and a value of the second count data piece is referred to as a first count data difference value. Likewise, a difference value between a value of the second count data piece and a value of the third count data piece is referred to as a second count data difference value. A numeric sequence in which the total number (N−1) of the difference values are differentiated and arranged as it is in this manner is referred to as a count data difference value sequence. There are M patterns of count data difference value sequences for the arbitrary (M, N). Then, in each count data difference value sequence, all of the count data difference values from the first to a (M−2) count data difference value are "1" (count incremental width L), a (M−1)th count data difference value is one of integers from "1" to "M" (j×L, where j is equal to or greater than 1 and equal to or smaller than M), and all of the count data difference values from a M-th count data difference value to a (N−1) count data difference value are "M" (L×M). Thus, a total number of patterns of the count data difference value sequence are M.

FIG. 10 is a diagram illustrating details of the count data difference value sequences for the respective sorted count data sequences from count numbers 0 (initial value) to 26, where (C, L, M, N)=(1, 1, 3, 6). In this example, M=3 and, hence, M−1=2. As described above, the first count data difference value is always "1," and the third count data difference value to a fifth count data difference value are always "M, where M is equal to 3," and only the second count data difference value takes an integer varying from "1" to "M," where M=3.

FIG. 11 is an organized diagram illustrating the count data difference value sequences, where (C, L, M, N)=(1, 1, 3, 6). As shown clearly in the figure, there are 3 count data difference value sequence patterns from a pattern [1] to a pattern [3].

In the above description, for the sorted count data sequence of the normal count data pieces, only the 12 patterns are possible, and only 3 patterns are possible for the count data difference value sequence patterns, in the case where (M, N)=(3, 6).

Next, referring to FIG. 12, relation between the count data address sequence patterns and the count data difference value sequence patterns is described. FIG. 12 is a diagram illustrating count data difference value sequence patterns that are possible for each count data address sequence pattern.

As described in the figure, any one count data address sequence pattern cannot take all of the count data difference value sequence patterns. Rather, each count data address sequence pattern takes only a specific number of count data difference value sequence patterns. For example, one from the count data difference value sequence patterns [1] and [3] is possible for a (normal) sorted count data sequence according to one of the count data address sequence patterns [01], [03], [05], [07], [09], and [11]. Further, only the count data difference value sequence pattern [2] is possible for a (normal) sorted count data sequence according to one of the count data address sequence patterns [02], [04], [06], [08], [10],

[12]. While this figure shows the case where (M, N)=(3, 6), the total number of the count data difference value sequence patterns that each count data address sequence pattern can take for an arbitrary combination of (M, N) is finite, and they are easily specified. For the person skilled in the art would easily appreciate this.

As described above, in the count data recording device according to the embodiment of the present invention, the count data sorting unit 27a (FIG. 4) forms the sorted count data sequence, the count data difference calculating unit 27b (FIG. 4) calculates the count data difference value sequence for the sorted count data sequence, the restoration process executing unit 27c compares the sorted count data sequence and the count data difference value sequence for the sorted count data sequence respectively with the count data address sequence patterns and the count data difference value sequence patterns that are previously retained, thereby detecting the corruption (abnormality) in the count data pieces and restoring the detected abnormal count data piece based on the value of the count data piece at a predetermined ordered position in the sorted count data sequence, as well as on the count data address sequence patterns and the count data difference value sequence patterns.

The following describes a process of writing the count data pieces and the process of detecting and restoring the abnormality carried out by the count data recording device according to the embodiment of the present invention.

(Count Data Writing Process)

FIG. 13 is a flowchart of the process in which a count data recording device 1 (FIG. 1) writes the count data pieces to the memory areas of the storage device 7 (FIG. 2).

In step S101, the data writing unit 25 (FIG. 4) writes an initial value to a memory area of the storage device 7 as initial setting. This process is necessary only when the count data recording device 1 is first activated, or when the storage device 7 is replaced.

In step S103, the control unit 23 (FIG. 4) transmits a count data writing instruction to the data writing unit 25. If the data writing unit 25 has received the count data writing instruction ("YES" in step S103), the process proceeds to step S105. If the data writing unit 25 has not received the count data writing instruction ("NO" in step S103), the process repeats step S103.

In step S105, the data writing unit 25 carries out writing of the count data piece once by the write address determining unit 25a determining a memory area within the storage device 7 to which the write address determining unit 25a writes the count data piece and the count data writing unit 25b writing the count data piece to the memory area. At this time, the write address determining unit 25a and the count data writing unit 25b refer to the setting data retaining unit 31 and such. By this, the memory area to which the count data piece is written and the value of the count data piece to be written are determined.

From step S107 to step S121, the write address determining unit 25a starts a process of setting a memory area to be used in the next count data writing and a value of the count data piece to be written in the next count data writing.

In step S107, the write address determining unit 25a determines whether or not the address of the memory area to which the count data piece has been written in step S105 that has been carried out immediately before is N-th address in the major loop. If the address of the memory area to which the count data piece has been written in immediately preceding step S105 is a last address (address [N]) in the address order of the major loop ("YES" in step S107), the process proceeds to step S111. If the address of the memory area to which the count data piece has been written in immediately preceding step S105 is not a last address in the address order of the major loop ("NO" in step S107), the process proceeds to step S109.

In step S109, the write address determining unit 25a sets a memory area that is managed to be succeeding the memory area to which the count data piece has been written in immediately preceding step S105, in the address order of the major loop, as the next data writing address.

In step S111, the write address determining unit 25a sets a memory area that is managed as a leading (first) memory area in the address order of the major loop as the next data writing address.

In step S113, the write address determining unit 25a determines whether or not the next data writing address that has been set either in step S109 or in step S111 is beyond a current range of the minor loop. If the write address determining unit 25a has determined that the next data writing address is beyond the current range of the minor loop ("YES" in step S113), the process proceeds to step S115. If the write address determining unit 25a has determined that the next data writing address is not beyond the current range of the minor loop ("NO" in step S113), the process proceeds to step S119, skipping step S115 and S117.

In step S115, the write address determining unit 25a manages a new range of the minor loop by shifting the range of the minor loop backward by a single address according to the address order of the major loop.

In step S117, the write address determining unit 25a sets an address that is managed as a leading (first) address in the new range of the minor loop as the next data writing address.

In step S119, the write address determining unit 25a determines and sets an address that is currently set as the next data writing address to be a data writing address.

In step S121, the data writing unit 25 set a value obtained by adding the count incremental width L to a value of the count data piece has been written in step S105 that has been carried out immediately before as a counting value. Further, the new data writing address and the new counting value can be retained by the write address determining unit 25a, or can be once recorded in the setting data retaining unit 31 and such.

In step S123, the control unit 23 determines whether or not the count data writing process is to be finished. If the control unit 23 has determined that the count data writing process is to be continued ("YES" in step S123), the process returns to step S103. If the control unit 23 has determined that the count data writing process is to be finished ("NO" in step S123), the whole count data writing process is finished.

(Count Data Corruption Detecting Process and Corruption Restoration Process)

The following describes the process of detecting abnormality (corruption) in the count data pieces and the process of restoring the corruption of the count data piece in the count data recording device according to the embodiment of the present invention.

FIG. 14 is a flowchart of the process, mainly carried out by the data restoring unit 27, of detecting the abnormality in the count data pieces and the process of restoring the detected abnormality.

In connection with step S201, the data reading unit 29 reads the count data pieces recorded in the first to N-th memory areas of the storage device 7 and transmits the read count data pieces to the data restoring unit 27.

In step S201, the count data sorting unit 27a of the data restoring unit 27 sorts the count data pieces received from the data reading unit 29 in descending order according to the values of the count data pieces. Here, a sequence of the sorted count data pieces is referred to as a sorted count data sequence. The sorted count data sequence is transmitted from the count data sorting unit 27a to the count data difference calculating unit 27b.

In step S203, the count data difference calculating unit 27b calculates difference values between values of the adjacent count data pieces in the sorted count data sequence. The difference values constitute a numeric sequence that includes a plurality of numeric values. The count data difference calculating unit 27b forms a numeric sequence by having the difference values in the sorted count data sequence be aligned so as to correspond to the sequence of the count data pieces, and transmits the numeric sequence to the restoration process executing unit 27c. Here, the numeric sequence constituted by the difference values is referred to as a count data difference value sequence for the sorted count data sequence.

In step S205, the restoration process executing unit 27c determines whether or not the count data difference value sequence for the sorted count data sequence matches any of count data difference value sequence patterns (as in such as FIGS. 9 and 11, etc.). If the restoration process executing unit 27c has determined that the count data difference value sequence for the sorted count data sequence matches one of the count data difference value sequence patterns ("YES" in step S205), the process finishes. In other words, the case in which it is determined to be "YES" in step S205 corresponds to a case in which the restoration process executing unit 27c has determined that the sorted count data sequence includes no abnormal count data piece (corrupted count data piece). If the restoration process executing unit 27c has determined that the count data difference value sequence for the sorted count data sequence does not match any of the count data difference value sequence patterns ("NO" in step S205), the process proceeds to step S207. In other words, the case in which it is determined to be "NO" in step S205 corresponds to a case in which the restoration process executing unit 27c has determined that the sorted count data sequence includes an abnormal count data piece(s) (corrupted count data piece(s)). In the succeeding process, the restoration process executing unit 27c carries out the process of restoring the corrupted count data piece.

In step S207, the restoration process executing unit 27c determines whether or not the first difference value in the count data difference value sequence for the sorted count data sequence matches a first count data difference value of any of the count data difference value sequence patterns. If the restoration process executing unit 27c has determined that the first difference value in the count data difference value sequence for the sorted count data sequence matches the first count data difference value of any of the count data difference value sequence patterns ("YES" in step S207), the process proceeds to step S209. If the restoration process executing unit 27c has determined that the first difference value in the count data difference value sequence for the sorted count data sequence does not match any of the first count data difference values of the count data difference value sequence patterns ("NO" in step S207), the process proceeds to step S3.

(Count Data Restoring Process 1)

Figure 15:
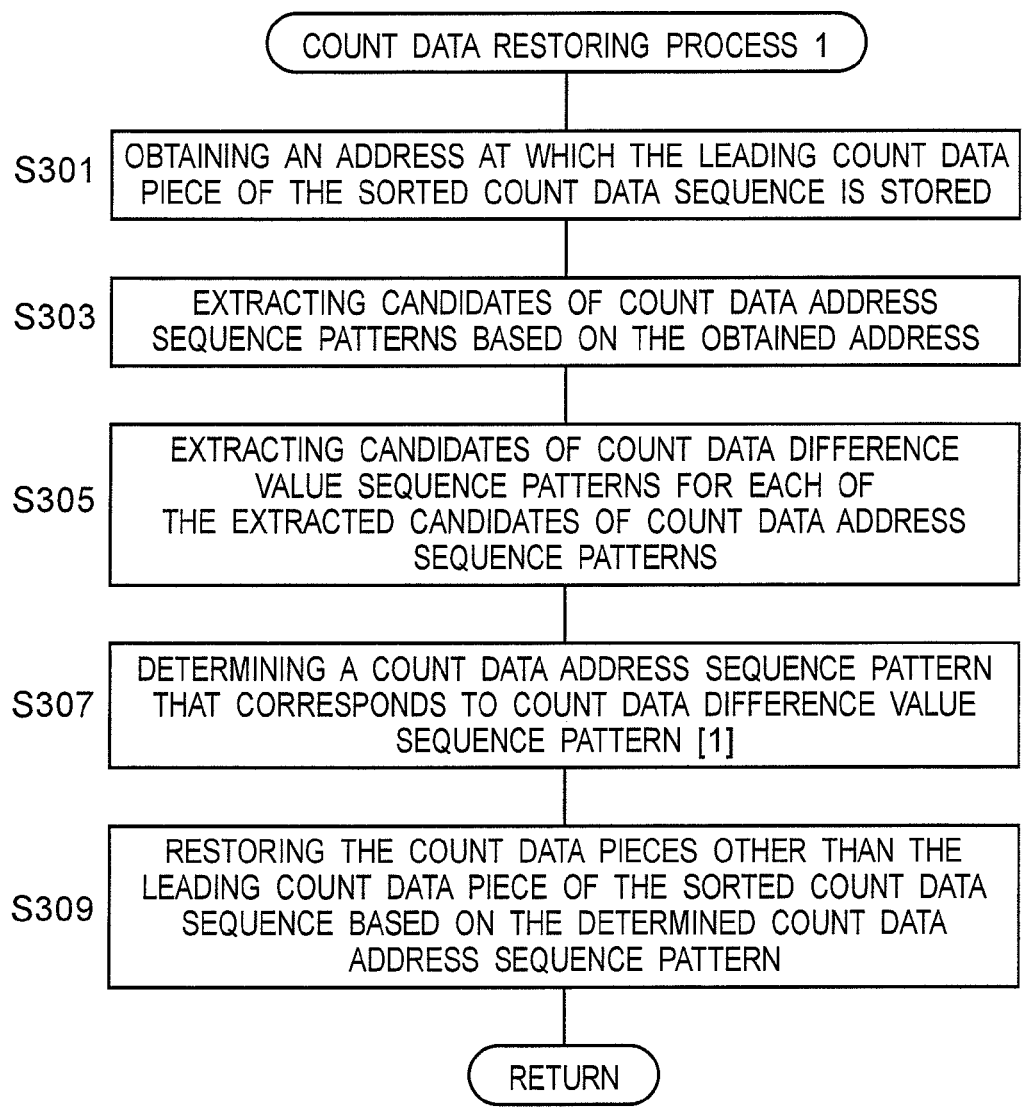
FIG. 15 is a detailed flowchart of a count data restoring process 1.

FIG. 15 is a detailed flowchart of a count data restoring process 1 (S3 in FIG. 14). In the following, the count data restoring process 1 is described with reference to FIG. 15. The count data restoring process 1 is a restoration process carried out when the first count data difference value is not normal. The first count data difference value is a difference value between the values of the leading (first) and second count data pieces in the sorted count data sequence. Therefore, the fact that the first count data difference value does not exhibit a normal value indicates that at least one of the value of the first count data piece and the value of the second count data piece in the sorted count data sequence is corrupted. In the count data restoring process 1 that will be later described, the value of the leading count data piece in the sorted count data sequence is deemed to be normal, and the values of the second and succeeding count data pieces in the sorted count data sequence are restored.

In step S301, the restoration process executing unit 27c obtains the address of the first count data piece in the sorted count data sequence.

In step S303, the restoration process executing unit 27c extracts count data address sequence patterns in which the address obtained in step S301 is at a leading position (see FIG. 8), and sets the extracted patterns to be candidate patterns for restoration.

In step S305, the restoration process executing unit 27c extracts count data difference value sequence patterns (see FIG. 11) corresponding to the extracted candidate patterns for restoration in step S303, and retains the extracted count data difference value sequence patterns being associated with the candidate patterns extracted in step S303 (see FIG. 12).

In step S307, the restoration process executing unit 27c specifies, among the candidate patterns and the count data difference value sequence patterns corresponding to the candidate patterns that have been extracted in steps S303 and S305, a count data address sequence pattern whose count data difference value sequence pattern is a count data difference value sequence pattern [1] (FIG. 11), and determines the count data address sequence pattern and the corresponding count data difference value sequence pattern to be a count data address sequence pattern and a count data difference value sequence pattern that are used for restoration. A principal significance of this step is in restoration of the values of the second to N-th count data pieces in the sorted count data sequence so that the count data difference value sequence for the sorted count data sequence of the restored count data pieces only includes 1 (more generally, the count incremental width L) and M (more generally, L×M). Further, the count data difference value sequence only including 1 (more generally, the count incremental width L) and M (more generally, L×M) corresponds that the (M−1)th count data difference value is 1 (more generally, L). (The count data difference values other than the (M−1)th count data difference value always include only 1 and M (more generally, L and L×M), if the count data pieces are normal.)

In step S309, the restoration process executing unit 27c restores the values of the second and succeeding count data pieces in the sorted count data sequence, based on the count data address sequence pattern for restoration that has been determined in step S307 and the corresponding count data difference value sequence pattern (count data difference value sequence pattern [1]) as well as on the value of the first count data piece in the sorted count data sequence.

Upon completion of the process in step S309, the restoration process ends (FIG. 14).

The count data restoring process 1 is enabled when restoring the corruption of the count data piece in a case in which count data piece abnormality is detected for the arbitrary combination of (M, N), the abnormality being such that the first count data difference value to k-th count data difference value in the sorted count data sequence, where k is an integer equal to or greater than 1 and equal to or smaller than M−3, are 1 (more generally, the count incremental width L), and (k+1)th count data difference value is not 1 (more generally, not L).

(Count Data Restoring Process 1 First Variation)

Figure 16:
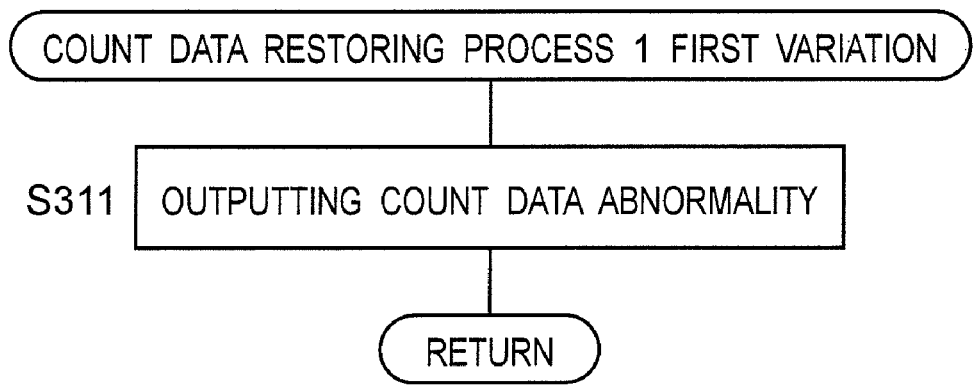
FIG. 16 is a detailed flowchart of a count data restoring process 1 first variation.

FIG. 16 is a flowchart of a variation (first variation) of the count data restoring process. In the following, the first variation of the count data restoring process 1 is described with reference to FIG. 16. According to the first variation of the count data restoring process 1, a process of notifying of the corruption in the count data pieces is carried out when the first count data difference value is not normal. In the first variation of the count data restoring process 1, the process of restoring the abnormality of the count data piece is not carried out.

In step S311, the restoration process executing unit 27c outputs a notification of the corruption in the count data pieces (count data piece abnormality). This output is transmitted, for example, to the control unit 23 (FIG. 4), and the control unit 23 carries out a predetermined process based on the output.

Upon completion of the process in step S311, the restoration process ends (FIG. 14).

(Count Data Restoring Process 1 Second Variation)

FIG. 17 is a flowchart of a variation (second variation) of the count data restoring process. In the following, the second variation of the count data restoring process 1 is described with reference to FIG. 17. The second variation of the count data restoring process 1 is also the restoration process carried out when the first count data difference value is not normal. Further, in this variation, a predetermined number of the count data difference values immediately after the first count data difference value are referred to, in the count data difference value sequence such as the second count data difference value, the third count data difference value, . . . , and it is determined whether more than or equal to the half of the total number of the count data difference values that are continuous from the second count data difference value indicate a normal value or not. Then, if the count data recording device determines that the plurality of continuous count data difference values indicate a normal value, the restoration process executing unit 27c recognizes that the values of the count data pieces that respectively correspond to the more than half normal count data difference values are normal, and restores such as the first count data piece in the sorted count data sequence based on the values of the count data pieces that are recognized as normal. FIG. 17 is flowchart of the second variation of the count data restoring process 1, taking an example where (L, M, N)=(1, 3, 6).

In step S313, the restoration process executing unit 27c refers to the second count data difference value in the count data difference value sequence for the sorted count data sequence, and determines whether or not the second count data difference value matches a second count data difference value of any of the count data difference value sequence patterns (FIG. 11). If the restoration process executing unit 27c has determined that the second count data difference value for the sorted count data sequence matches the second count data difference value of one of the count data difference value sequence patterns (FIG. 11) ("YES" in step S313), the process proceeds to step S315. If the restoration process executing unit 27c has determined that the second count data difference value for the sorted count data sequence matches none of the second count data difference values of the count data difference value sequence patterns (FIG. 11) ("NO" in step S313), the process proceeds to step S319.

In step S315, the restoration process executing unit 27c refers to third count data difference value and fourth count data difference value in the count data difference value sequence for the sorted count data sequence, and determines whether or not both of the third and fourth count data difference values respectively match third count data difference value and fourth count data difference value for any of the count data difference value sequence patterns in which the second count data difference values are determined to match in step S313. If the restoration process executing unit 27c has determined that the third and fourth count data difference values for the sorted count data sequence match third and fourth count data difference values for any of the count data difference value sequence patterns in which the second count data difference values are determined to match in step S313 ("YES" in step S315), the process proceeds to step S317. If the restoration process executing unit 27c has determined that the third and fourth count data difference values for the sorted count data sequence match none of third and fourth count data difference values for any of the count data difference value sequence patterns in which the second count data difference values are determined to match in step S313 ("NO" in step S315), the process proceeds to step S317.

Specifically, when N=6, the count data difference value sequence is constituted by five difference values. Accordingly, the case in which it is determined to be "YES" in step S315 and the process proceeds to step S317 corresponds to a case in which more than the half of the count data difference values including the second count data difference value are determined to be normal. When the total number of the addresses that constitute the major loop is N, the count data difference value sequence is constituted by (N−1) values. Accordingly, it is only necessary to determine whether or not the count data difference values including and after the second count data difference value of an integer number [pieces] that is smallest and that is equal to or greater than (N−1)/2 are normal.

In step S317, the restoration process executing unit 27c obtains a value derived by adding 1 (more generally, the count incremental width L) to the value of the second count data piece in the sorted count data sequence, and restores the value of the first count data piece in the sorted count data sequence using the obtained value.

In step S319, the restoration process executing unit 27c outputs a notification of the corruption in the count data pieces (count data piece abnormality). This output is transmitted to, for example, the control unit 23 (FIG. 4), and the control unit 23 carries out the predetermined process based on this output.

Upon completion of the process in step S319, the restoration process ends (FIG. 14).

In step S321, the restoration process executing unit 27c refers to fifth count data difference value in the count data difference value sequence for the sorted count data sequence, and determines whether or not the fifth count data difference value matches fifth count data difference value of any of the count data difference value sequence patterns in which the second, third, and fourth count data difference values are determined to match in steps S313 and S315. If the restoration process executing unit 27c has determined that the fifth count data difference value in the count data difference value sequence for the sorted count data sequence matches a fifth count data difference value in any of the count data difference value sequence patterns in which the second, third, and fourth count data difference values are determined to match in steps S313 and S315 ("YES" in step S321), the process of the second variation of the count data restoring process 1 ends. This indicates that the restoration process executing unit 27c has determined that it is not necessary to restore the value of the sixth count data piece in the sorted count data sequence. If the restoration process executing unit 27c has determined that the fifth count data difference value in the count data difference value sequence for the sorted count data sequence matches none of fifth count data difference value in any of the count data difference value sequence patterns in which the second, third, and fourth count data difference values are determined to match in steps S313 and S315 ("NO" in step S321), the process proceeds to step S323.

In step S323, the restoration process executing unit 27c obtains a value derived by adding 3 (more generally, a product of the count incremental width L and the total number M of the addresses that constitute the minor loop) to the value of the fifth count data piece in the sorted count data sequence, and restores the value of the sixth count data piece in the sorted count data sequence using the obtained value.

Upon completion of the process in step S323, the restoration process ends (FIG. 14).

Next, the case in which it is determined to be "YES" in step S207 of FIG. 14 is described.

In step S209, the restoration process executing unit 27c determines whether or not second difference value in the count data difference value sequence for the sorted count data sequence matches second count data difference value in any of the count data difference value sequence patterns that have been determined to match in step S207. If the restoration process executing unit 27c has determined that the second count data difference value for the sorted count data sequence matches the second count data difference value in any of the count data difference value sequence patterns that have been determined to match in step S207 ("YES" in step S209), the process proceeds to step S211. If the restoration process executing unit 27c has determined that the second count data difference value for the sorted count data sequence matches none of second count data difference value in any of the count data difference value sequence patterns that have been determined to match in step S207 ("NO" in step S209), the process proceeds to step S4.

(Count Data Restoring Process 2)

Figure 18B:
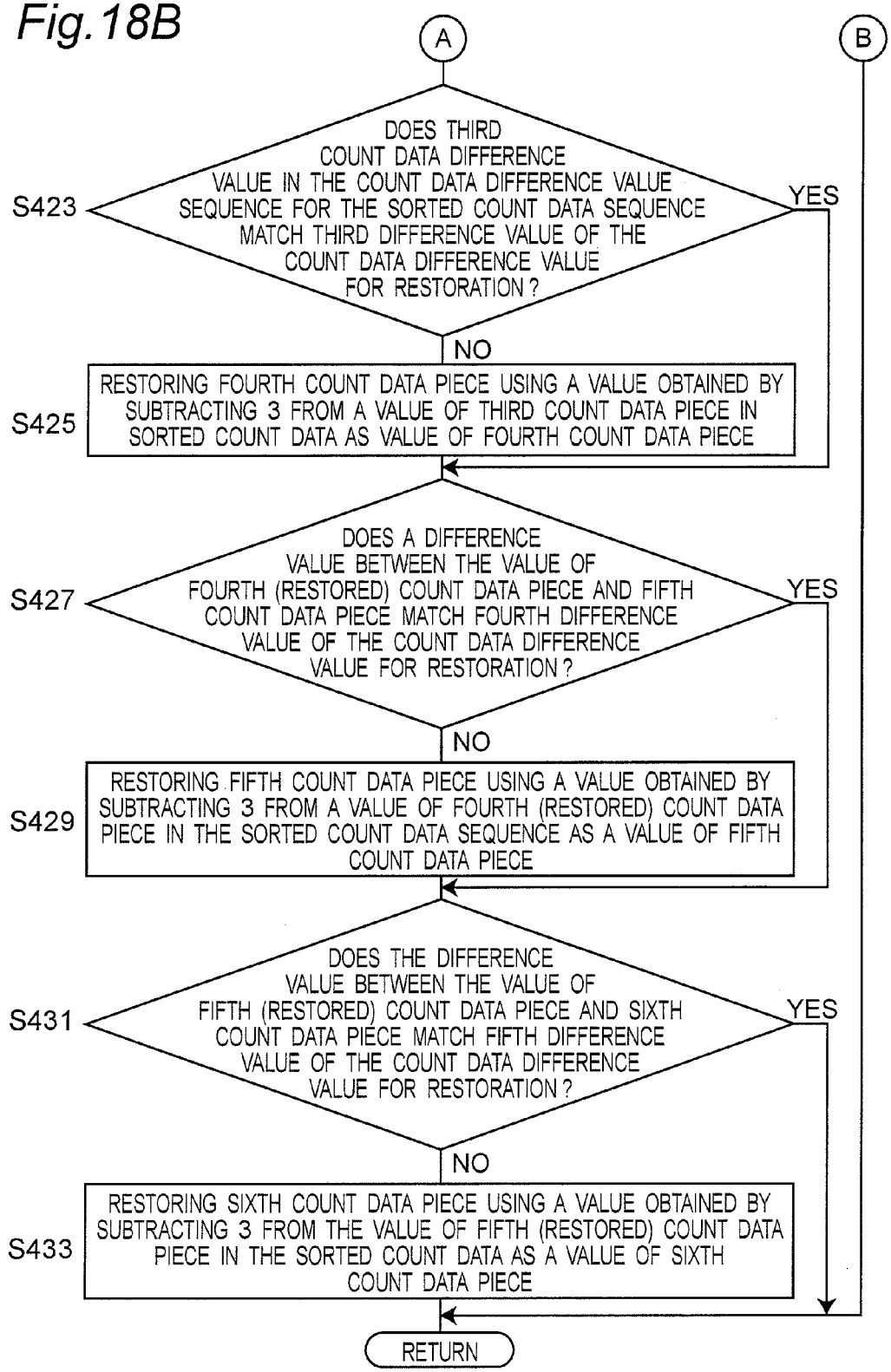

FIGS. 18A and 18B are respectively a detailed flowchart of a count data restoring process 2 (S4 in FIG. 14). In the following, the count data restoring process 2 is described with reference to FIGS. 18A and 18B. The count data restoring process 2 is a restoration process carried out when the first count data difference value is normal, but the second count data difference value is not normal. The second count data difference value is a difference value between the values of second and third count data pieces in the sorted count data sequence. Therefore, the fact that the first count data difference value is normal but the second count data difference value is not normal indicates that the value of the third count data piece in the sorted count data sequence is highly possibly corrupted. The following describes the count data restoring process 2 taking a case in which the total number M of the addresses that constitute the minor loop is 3. The count data restoring process 2 is enabled when restoring the corruption of the count data piece in a case in which, regarding the total number M of the addresses that constitute the minor loop, first to (M−2)th count data difference values are normal, but a (M−1)th count data difference value exhibits a value that is not normal.

In step S401, the restoration process executing unit 27c obtains the addresses of the leading (first) and second count data pieces in the sorted count data sequence.

In step S403, the restoration process executing unit 27c extracts count data address sequence patterns (see FIG. 8) in which first and second addresses obtained in step S401 are respectively at leading and second positions, and sets the extracted patterns to be the candidate patterns for restoration.

In step S405, the restoration process executing unit 27c extracts count data difference value sequence patterns (see FIG. 11) corresponding to the candidate patterns for restoration extracted in step S403, and retains the extracted count data difference value sequence patterns being associated with the candidate patterns extracted in step S403 (see FIG. 12).

In step S407, the restoration process executing unit 27c calculates a residue derived by dividing a value of the first count data piece in the sorted count data sequence by the total number M (for example, "3") of the addresses that constitute the minor loop. Then, based on the residue, the restoration process executing unit 27c determines the count data difference value sequence pattern for restoration among the count data difference value sequence patterns that have been extracted in step S405. This step is based on the following principles. Referring to FIGS. 9 and 10, it can be seen that variation of the (M−1)th count data difference value is with a cycle of M [times] for the counting number. From an example shown in FIG. 10 (where M=3), the second count data difference value ((M−1)th difference value) varies on a cycle of 3 [times], such as 1, 2, 3, 1, 2, 3, . . . , for the counting number, when the count incremental width L is 1. Further, the count number is the value of the first count data piece in the sorted count data sequence. Accordingly, as long as the value of the first count data piece in the sorted count data sequence is normal, the second count data difference value ((M−1)th count data difference value) can be obtained by the value of the residue derived by dividing the value of the first count data piece in the sorted count data sequence by the total number M of the addresses that constitute the minor loop. Further, even if the count incremental width L is not 1, it is easy to obtain the second count data difference value ((M−1)th count data difference value) based on the residue by considering the value of L in the process of deriving the residue. Specifically, instead of the residue derived by dividing the first value in the sorted count data sequence by the total number M of the addresses that constitute the minor loop, a residue derived by dividing a quotient obtained by first dividing the value of the first count data piece in the sorted count data sequence by the count incremental width L by the division by the total number M of the addresses in the minor loop can be used for an arbitrary count incremental width L. In this embodiment, the count incremental width L is taken as +1. Therefore, in the above description of the process in step S407, a step of dividing the value of the first count data piece in the sorted count data sequence by the count incremental width L is omitted. It should be appreciated that, even when the count incremental width L is 1, the step of dividing the value of the first count data piece in the sorted count data sequence by the count incremental width L can be carried out in the process in step S407.

In step S409, the restoration process executing unit 27c determines whether or not the only one count data difference value sequence pattern for restoration is determined as a result of the process in step S407. If the restoration process executing unit 27c has determined that the only one count data difference value sequence pattern for restoration has been determined by the process in step S407 ("YES" in step S407), the process proceeds to step S411. If the restoration process executing unit 27c has determined that only one count data difference value sequence pattern for restoration has not been determined by the process in step S407 ("NO" in step S407), the process proceeds to step S415.

In step S411, the restoration process executing unit 27c determines whether or not the count data difference value sequence pattern for restoration that has been determined in step S407 is the count data difference value sequence pattern [1]. If the restoration process executing unit 27c has determined that the count data difference value sequence pattern for restoration is count data difference value sequence pattern [1] ("YES" in step S411), the process proceeds to S417. The restoration process executing unit 27c has determined that the count data difference value sequence pattern for restoration is not the count data difference value sequence pattern [1] ("NO" in step S411), the process proceeds to S413.

In step S413, the restoration process executing unit 27c determines whether or not the count data difference value sequence pattern for restoration that has been determined in step S407 is the count data difference value sequence pattern [2]. If the restoration process executing unit 27c has determined the count data difference value sequence pattern for restoration is the count data difference value sequence pattern [2] ("YES" in step S413), the process proceeds to S419. If the restoration process executing unit 27c has determined the count data difference value sequence pattern for restoration is not count data difference value sequence pattern [2] ("NO" in step S413), the process proceeds to S421. In other words, the count data difference value sequence pattern for restoration in this case is count data difference value sequence pattern [3].

Specifically, in the count data restoring process 2, the restoration process executing unit 27c determines a normal second count data difference value ((M−1)th count data difference value) based on the residue derived by dividing the value of first count data piece in the sorted count data sequence by the total number M of the addresses that constitute the minor loop, and determines the one count data difference value sequence pattern used for the restoration process based on the determination. Then, after step S417, the restoration process executing unit 27c carries out the restoration process of the count data piece based on the count data difference value sequence pattern for restoration. An explanation of the count data restoring process for the general total number M of the minor loop addresses is omitted, as it would be appreciated for a person skilled in the art from the description that follows.

In step S415, the restoration process executing unit 27c outputs a notification of the corruption in the count data pieces (count data piece abnormality). This output is transmitted to, for example, the control unit 23 (FIG. 4), and the control unit 23 carries out the predetermined process based on this output.

Upon completion of the process in step S415, the restoration process ends (FIG. 14).

In step S417, the restoration process executing unit 27c restores third (M-th) count data piece in the sorted count data sequence, using the value obtained by subtracting 1 (more generally, subtracting the count incremental width L) from the value of the second ((M−1)th) count data piece in the sorted count data sequence.

In step S419, the restoration process executing unit 27c restores third (M-th) count data piece in the sorted count data sequence, using the value obtained by subtracting 2 (more generally, subtracting 2×L) from the value of the second ((M−1)th) count data piece in the sorted count data sequence.

In step S421, the restoration process executing unit 27c restores third (M-th) count data piece in the sorted count data sequence, using the value obtained by subtracting 3 (more generally, subtracting 3×L (=M×L)) from the value of the second ((M−1)th) count data piece in the sorted count data sequence.

In this manner, by steps S417, S419, and S421, the value of third count data piece in the sorted count data sequence is restored.

Next, in processes of and after step S423, the restoration process executing unit 27c restores values of fourth and succeeding count data pieces in the sorted count data sequence. The processes of and after step S423, for the general (M, N), correspond to the restoration process of restoring the (M+1)th to N-th count data pieces in the sorted count data sequence. An explanation of the restoration process of restoring the (M+1)th to N-th count data pieces in the sorted count data sequence for the general total number M of the minor loop addresses and the general total number N of the major loop addresses is omitted, as it would be appreciated for a person skilled in the art from the description that follows.

In step S423, the restoration process executing unit 27c determines whether or not third count data difference value (after the restoration of the value of the third count data piece) for the sorted count data sequence matches a third count data difference value in the count data difference value sequence pattern for restoration that has been determined in step S407. If the restoration process executing unit 27c has determined that the third count data difference value for the sorted count data sequence (after the restoration) matches the third count data difference value for the count data difference value sequence pattern for restoration ("YES" in step S423), the process proceeds to step S427. If the restoration process executing unit 27c has determined that the third count data difference value for the sorted count data sequence (after the restoration) does not match the third count data difference value for the count data difference value sequence pattern for restoration ("NO" in step S423), the process proceeds to step S425.

In step S425, the restoration process executing unit 27c restores fourth ((M+1)th) count data piece in the sorted count data sequence, using the value obtained by subtracting 3 (more generally, subtracting L×M) from the value of the third count data piece in the sorted count data sequence.

In step S427, the restoration process executing unit 27c determines whether or not a difference value between the value of fourth count data piece (after the restoration in step S425) in the sorted count data sequence and the value of fifth count data piece (fourth count data difference value) matches fourth count data difference value for the count data difference value sequence pattern for restoration that has been determined in step S407. If the restoration process executing unit 27c has determined that the fourth count data difference value (after the restoration) for the sorted count data sequence matches the fourth count data difference value in the count data difference value sequence pattern for restoration ("YES" in step S427), the process proceeds to step S431. If the restoration process executing unit 27c has determined that the fourth count data difference value (after the restoration) for the sorted count data sequence does not match the fourth count data difference value in the count data difference value sequence pattern for restoration ("NO" in step S427), the process proceeds to step S429.

In step S429, the restoration process executing unit 27c restores fifth ((M+2)th, i.e. (N−1)th) count data piece in the sorted count data sequence, using the value obtained by subtracting 3 (more generally, subtracting L×M) from the value of the fourth count data piece in the sorted count data sequence.

In step S431, the restoration process executing unit 27c determines whether or not a difference value between the value of the fifth count data piece (after the restoration in step S429) in the sorted count data sequence and the value of the sixth count data piece (fifth count data difference value) matches a fifth count data difference value in the count data difference value sequence pattern for restoration that has been determined in step S407. If the restoration process executing unit 27c has determined that the fifth count data difference value (after the restoration) for the sorted count data sequence matches the fifth count data difference value in the count data difference value sequence pattern for restoration ("YES" in step S431), the restoration process 2 ends (FIG. 14). If the restoration process executing unit 27c has determined that the fifth count data difference value (after the restoration) for the sorted count data sequence does not match the fifth count data difference value in the count data difference value sequence pattern for restoration ("NO" in step S431), the process proceeds to step S433.

In step S433, the restoration process executing unit 27c restores sixth (N-th) count data piece in the sorted count data sequence, using the value obtained by subtracting 3 (more generally, subtracting L×M) from the value of the fifth count data piece in the sorted count data sequence.

Next, the case in which it is determined to be "YES" in step S209 of FIG. 14 is described.

In step S211, the restoration process executing unit 27c determines whether or not third difference value in the count data difference value sequence for the sorted count data sequence matches third count data difference value in any of the count data difference value sequence patterns that have been determined to match in steps S207 and S209. If the restoration process executing unit 27c has determined that the third count data difference value for the sorted count data sequence matches the third count data difference value in any of the count data difference value sequence patterns that have been determined to match in steps S207 and S209 ("YES" in step S211), the process proceeds to step S213. If the restoration process executing unit 27c has determined that the third count data difference value for the sorted count data sequence does not match none of the third count data difference value in any of the count data difference value sequence patterns that have been determined to match in steps S207 and S209 ("NO" in step S211), the process proceeds to step S5.

(Count Data Restoring Process 3)

Figure 19:
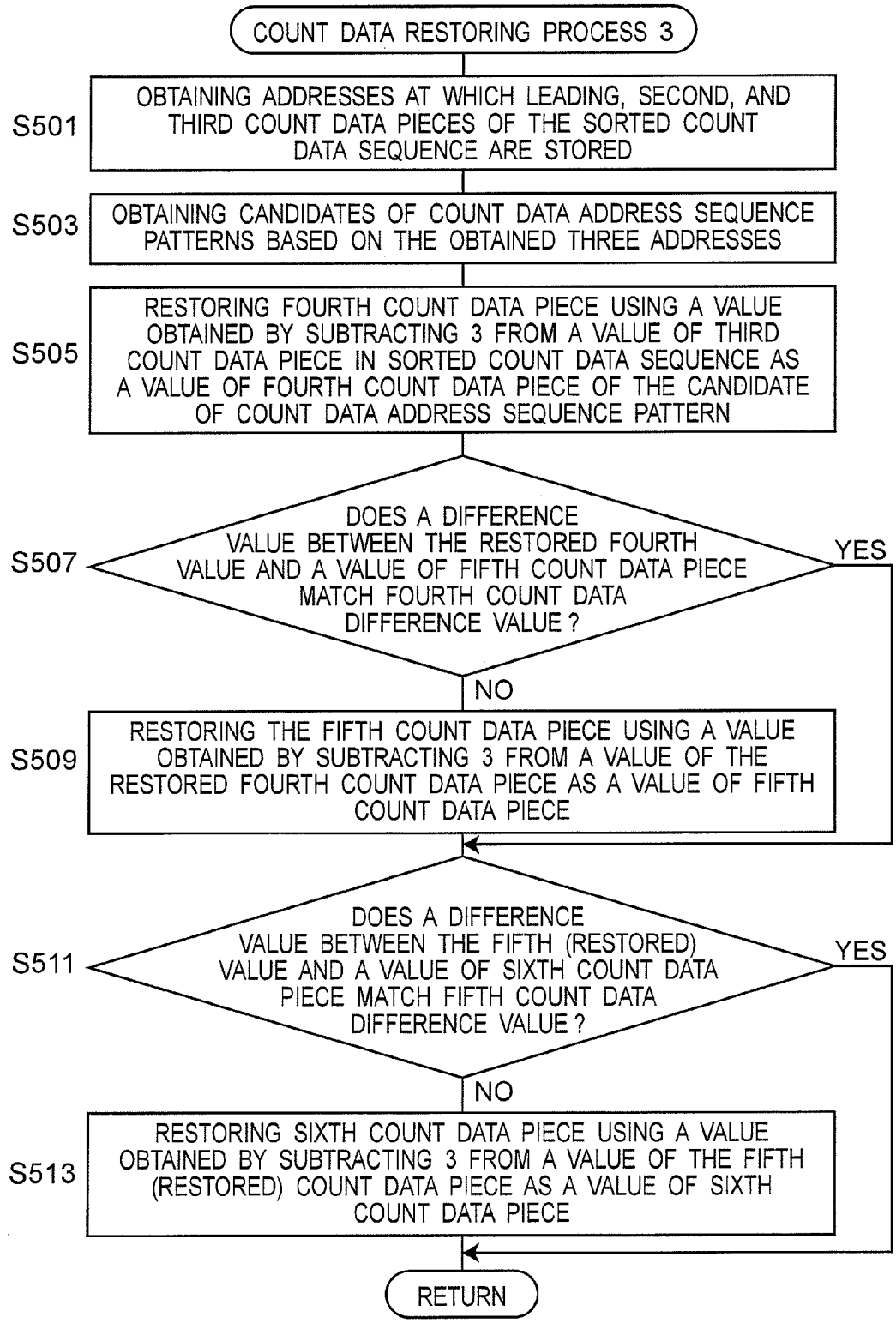
FIG. 19 is a detailed flowchart of a count data restoring process 3.

FIG. 19 is a detailed flowchart of a count data restoring process 3 (S5 in FIG. 14). In the following, the count data restoring process 3 is described with reference to FIG. 19. The count data restoring process 3 is a restoration process carried out when first and second count data difference values are normal, but third count data difference value is not normal. The third count data difference value is a difference value between the values of the third and fourth count data pieces in the sorted count data sequence. Therefore, the fact that the first and second count data difference values are normal but the third count data difference value is not normal indicates that the value of the fourth count data piece in the sorted count data sequence is highly possibly corrupted. The following describes the count data restoring process 3, taking a case in which the total number M of the addresses that constitute the minor loop is 3. The count data restoring process 3 is enabled when restoring the corruption of the count data piece in a case in which count data piece abnormality is detected such that, regarding the general (M, N), the first to (M−1+p)th count data difference values in the sorted count data sequence, where p is an integer equal to or greater than 0 and equal to or smaller than N−M−1, exhibit values that are normal, but a (M−1+p+1)th count data difference value is not normal.

In step S501, the restoration process executing unit 27c obtains addresses of the leading (first), second, and third count data pieces in the sorted count data sequence.

In step S503, the restoration process executing unit 27c extracts count data address sequence patterns in which the first, second, and third addresses obtained in step S501 are respectively at leading, second, and third positions in the corresponding sequence (see FIG. 8), and sets the extracted patterns to be the candidates of the count data address sequence pattern for restoration. In this step, for the general (M, N), the addresses of the first, second, . . . , and (M−1+p)th count data pieces in the sorted count data sequence may be obtained, and the candidates of the count data address sequence patterns for restoration can be extracted based on the obtained addresses.

In step S505, the restoration process executing unit 27c restores fourth ((M−1+p+2)th) count data piece in the sorted count data sequence, using the value obtained by subtracting 3 (more generally, subtracting L×M) from the value of the third ((M−1+p+1)th) count data piece in the sorted count data sequence.

In step S507, the restoration process executing unit 27c determines whether or not fourth count data difference value (after the restoration of the value of the fourth count data piece) for the sorted count data sequence matches fourth count data difference value of the candidates of the count data difference value sequence pattern for restoration extracted in step S503. If the restoration process executing unit 27c has determined that the fourth count data difference value (after the restoration) for the sorted count data sequence matches the fourth count data difference value of the candidates of the count data difference value sequence pattern for restoration ("YES" in step S507), the process proceeds to step S511. If the restoration process executing unit 27c has determined that the fourth count data difference value (after the restoration) for the sorted count data sequence matches none of the fourth count data difference value of the candidates of the count data difference value sequence pattern for restoration ("NO" in step S507), the process proceeds to step S509.

In step S509, the restoration process executing unit 27c restores the fifth count data piece in the sorted count data sequence, using the value obtained by subtracting 3 (more generally, subtracting L×M) from the value of the fourth count data piece in the sorted count data sequence.

In step S511, the restoration process executing unit 27c determines whether or not fifth count data difference value (after the restoration of the value of the fifth count data piece) for the sorted count data sequence matches fifth count data difference value of the candidates of the count data difference value sequence pattern for restoration for restoration extracted in step S503. If the restoration process executing unit 27c has determined that the fifth count data difference value (after the restoration) for the sorted count data sequence matches the fifth count data difference value of the candidates of the count data difference value sequence pattern for restoration ("YES" in step S511), the restoration process ends (see FIG. 14). If the restoration process executing unit 27c has determined that the fifth count data difference value (after the restoration) for the sorted count data sequence matches none of the fifth count data difference value of the candidates of the count data difference value sequence pattern for restoration ("NO" in step S511), the process proceeds to step S513.

In step S513, the restoration process executing unit 27c restores the sixth count data piece in the sorted count data sequence, using the value obtained by subtracting 3 (more generally, subtracting L×M) from the value of the fifth count data piece in the sorted count data sequence.

Next, the case in which it is determined to be "YES" in step S211 of FIG. 14 is described.

In step S213, the restoration process executing unit 27c determines whether or not fourth difference value in the count data difference value sequence for the sorted count data sequence matches the fourth count data difference value in any of the count data difference value sequence patterns that have been determined to match in steps S207, S209, and S211. If the restoration process executing unit 27c has determined that the fourth count data difference value for the sorted count data sequence matches the fourth count data difference value in any of the count data difference value sequence patterns that have been determined to match in steps S207, S209, and S211 ("YES" in step S213), the process proceeds to step S7. If the restoration process executing unit 27c has determined that the fourth count data difference value for the sorted count data sequence matches none of the fourth count data difference value in any of the count data difference value sequence patterns that have been determined to match in steps S207, S209, and S211 ("NO" in step S213), the process proceeds to step S6.

(Count Data Restoring Process 4)

Figure 20:
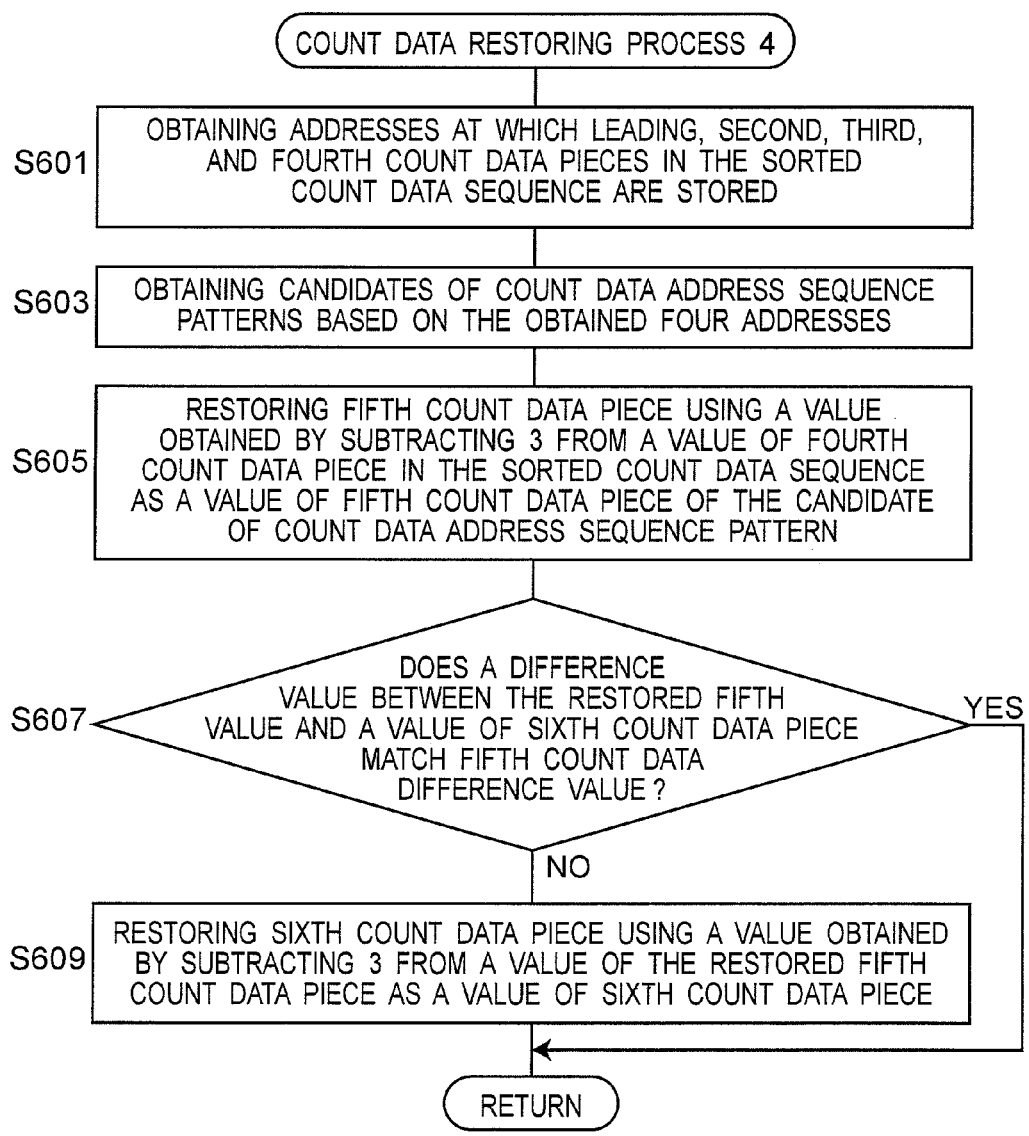
FIG. 20 is a detailed flowchart of a count data restoring process 4.

FIG. 20 is a detailed flowchart of a count data restoring process 4 (S6 in FIG. 14). In the following, the count data restoring process 4 is described with reference to FIG. 20. The count data restoring process 4 is a restoration process carried out when the first, second, and third count data difference values are normal, but the fourth count data difference value is not normal. The fourth count data difference value is a difference value between the values of the fourth and fifth count data pieces in the sorted count data sequence. Therefore, the fact that the first, second, and third count data difference values are normal but the fourth count data difference value is not normal indicates that the value of the fifth count data piece in the sorted count data sequence is highly possibly corrupted. The following describes the count data restoring process 4, taking a case in which (M, N)=(3, 6). The count data restoring process 4 is enabled, similarly to the count data restoring process 3, when restoring the corruption of the count data piece in a case in which count data piece abnormality is detected such that, regarding the general (M, N), the first to (M−1+p)th count data difference values in the sorted count data sequence, where p is an integer equal to or greater than 0 and equal to or smaller than N−M−1, exhibit values that are normal, but a (M−1+p+1)th count data difference value is not normal.

In step S601, the restoration process executing unit 27c obtains addresses of the leading (first), second, third, and fourth count data pieces in the sorted count data sequence.

In step S603, the restoration process executing unit 27c extracts count data address sequence patterns in which the first, second, third, and fourth addresses obtained in step S601 are respectively at leading, second, third, and fourth positions in the corresponding sequence (see FIG. 8), and sets the extracted patterns to be the candidates of the count data address sequence pattern for restoration.

In step S605, the restoration process executing unit 27c restores the fifth count data piece in the sorted count data sequence, using the value obtained by subtracting 3 (more generally, subtracting L×M) from the value of the fourth count data piece in the sorted count data sequence.

In step S607, the restoration process executing unit 27c determines whether or not fifth count data difference value (after the restoration of the value of the fifth count data piece) for the sorted count data sequence matches a fifth count data difference value of the candidates of the count data difference value sequence pattern for restoration extracted in step S503. If the restoration process executing unit 27c has determined that the fifth count data difference value (after the restoration) for the sorted count data sequence matches the fifth count data difference value of the candidates of the count data difference value sequence pattern for restoration ("YES" in step S607), the restoration process ends (see FIG. 14). If the restoration process executing unit 27c has determined that the fifth count data difference value(after the restoration) for the sorted count data sequence matches none of the fifth count data difference value of the candidates of the count data difference value sequence pattern for restoration ("NO" in step S607), the process proceeds to step S609.

In step S609, the restoration process executing unit 27c restores the sixth count data piece in the sorted count data sequence, using the value obtained by subtracting 3 (more generally, subtracting L×M) from the value of the fifth count data piece in the sorted count data sequence.

Next, step S7 in FIG. 14 is described.

(Count Data Restoring Process 5)

Figure 21:
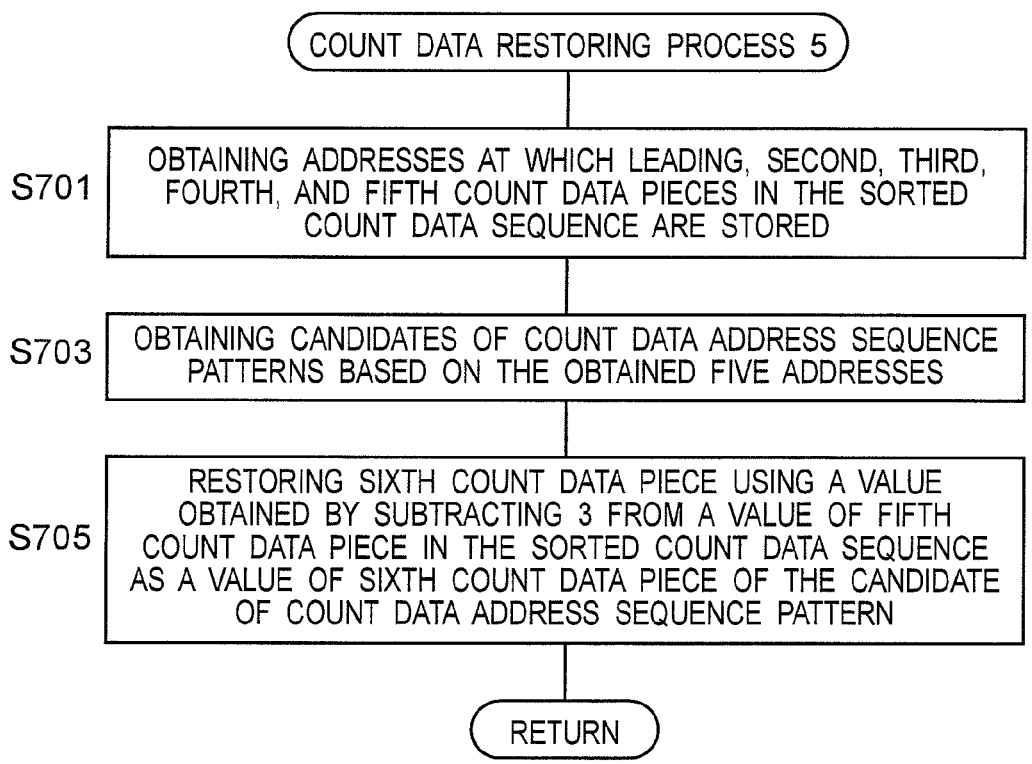
FIG. 21 is a detailed flowchart of a count data restoring process 5 in detail.

FIG. 21 is a detailed flowchart of a count data restoring process 5 (S7 in FIG. 14). In the following, the count data restoring process 5 is described with reference to FIG. 21. The count data restoring process 5 is a restoration process carried out when the first, second, third, and fourth count data difference values are normal, but the fifth count data difference value is not normal. The fifth count data difference value is a difference value between the values of the fifth and sixth count data pieces in the sorted count data sequence. Therefore, the fact that the first, second, third, and fourth count data difference values are normal but the fifth count data difference value is not normal indicates that the value of the sixth count data piece in the sorted count data sequence is highly possibly corrupted. The following describes the count data restoring process 5, taking a case in which (M, N)=(3, 6). The count data restoring process 5 is enabled, similarly to the count data restoring processes 3 and 4, when restoring the corruption of the count data piece in a case in which count data piece abnormality is detected such that, regarding the general (M, N), the first to (M−1+p)th count data difference values in the sorted count data sequence, where p is an integer equal to or greater than 0 and equal to or smaller than N−M−1, exhibit values that are normal, but (M−1+p+1)th count data difference value is not normal.

In step S701, the restoration process executing unit 27c obtains addresses of the leading (first), second, third, fourth, and fifth count data pieces in the sorted count data sequence.

In step S703, the restoration process executing unit 27c extracts count data address sequence patterns in which the first, second, third, fourth, and fifth addresses obtained in step S701 are respectively at leading, second, third, fourth, and fifth positions in the corresponding sequence (see FIG. 8), and sets the extracted patterns to be the candidates of the count data address sequence pattern for restoration.

In step S705, the restoration process executing unit 27c restores the sixth count data piece in the sorted count data sequence, using the value obtained by subtracting 3 (more generally, subtracting L×M) from the value of the fifth count data piece in the sorted count data sequence.

As described above, the count data recording device according to the embodiment of the present invention records the count data pieces cyclically using the N memory areas, where N is an integer equal to or greater than 4, according to the predetermined order. Further, the count data recording device according to the embodiment of the present invention defines the minor loop that is constituted by the M addresses that are continuous according to the predetermined order, where M is an integer equal to or greater than 3 and smaller than N, for the N memory areas in which the count data pieces are recorded, and records the count data pieces using the M addresses according to the order. Then, after recording the count data piece using the last address in the minor loop, the count data recording device according to the embodiment of the present invention shifts the range of the minor loop backward by one address according to the predetermined order, and uses the leading address in the shifted minor loop for the succeeding recording of the count data piece. In this manner, the order of the addresses in the sorted count data sequence that have been sorted according to the values of the count data pieces match one of the predetermined and finite number of sequence patterns. Further, the numeric sequence constituted by the difference values between the values of the adjacent count data pieces in the sorted count data sequence (count data difference value sequence) also matches one of the predetermined and finite number of sequence patterns. The count data recording device according to the embodiment of the present invention is capable of restoring the corrupted count data piece included in the count data sequence, based on one or more values of the count data piece at the predetermined ordered position(s) in the count data address sequence and the count data difference value sequence for the sorted count data sequence, as well as the sorted count data sequence.

(Restoration Process Execution Example)

The following describes an execution example of a method for restoring the count data piece according to the embodiment of the present invention.

(Restoration Process Execution Example 1)

FIG. 22 is a diagram illustrating an example of the count data pieces used in a first restoration process execution example. In this example, (C, L, M, N)=(1, +1, 3, 6).

In step S201 (FIG. 14), the count data sorting unit 27a (FIG. 4) sorts the count data pieces (FIG. 22) in descending order to derive the sorted count data sequence.

FIG. 23 is a diagram illustrating the sorted count data sequence derived in step S201.

Next, in step S203 (FIG. 14), the count data difference calculating unit 27b obtains difference values between the adjacent count data pieces in the sorted count data sequence (FIG. 23), and derives the count data difference value sequence.

FIG. 24 is a diagram illustrating the count data difference value sequence derived in step S203.

Then, in step S205 (FIG. 14), the restoration process executing unit 27c determines whether or not the count data difference value sequence (FIG. 24) matches any of the count data difference value sequence patterns [1] to [3] (FIG. 11). Since the count data difference value sequence (FIG. 24) matches none of the count data difference value sequence patterns [1] to [3] (FIG. 11), the process proceeds to step S207 (FIG. 14).

In step S207, the restoration process executing unit 27c determines whether or not first difference value in the count data difference value sequence (FIG. 24) matches the first count data difference value in any of the count data difference value sequence patterns [1] to [3] (FIG. 11). Since the first difference value in the count data difference value sequence matches none of the first count data difference value of any of the count data difference value sequence patterns [1] to [3], the process proceeds to step S3.

(Count Data Restoring Process 1)

The count data restoring process 1 which is depicted as step S3 in FIG. 14 has two other variations (FIGS. 16 and 17), in addition to the process shown in FIG. 15. The following describes execution examples for these three variations of the count data restoring process 1 one by one.

(Restoration Process Using Count Data Restoring Process 1 (FIG. 15))

In step S301 (FIG. 15), the restoration process executing unit 27c obtains the address of the leading count data piece in the sorted count data sequence (FIG. 23). Here, the address is an "address [2]."

In step S303 (FIG. 15), the restoration process executing unit 27c extracts the count data address sequence patterns in which the address of the leading count data piece is "address [2]" among the count data address sequence patterns [01] to [12] (FIG. 8). Here, as shown in FIG. 25, the count data address sequence patterns [1] and [4] are extracted as the candidates of the count data address sequence pattern.

In step S305 (FIG. 15), the restoration process executing unit 27c extracts the candidates of the count data difference value sequence pattern for each of the count data address sequence patterns [1] and [4] (see FIG. 12). Here, as shown in FIG. 26, the count data difference value sequence patterns corresponding to the count data address sequence pattern [1] are pattern [1] and pattern [3], and the count data difference value sequence pattern corresponding to the count data address sequence pattern [4] is pattern [2].

In step S307 (FIG. 15), the restoration process executing unit 27c determines that the count data address sequence pattern [1] (FIG. 26) that corresponds to the count data difference value sequence pattern [1] to be the count data address sequence pattern for restoration.

In step S309 (FIG. 15), the restoration process executing unit 27c restores count data pieces other than the leading count data piece in the sorted count data sequence (FIG. 23), based on the count data address sequence pattern [1] and the count data difference value sequence pattern [1]. FIG. 27 shows the values of the count data pieces before and after the restoration.

(Restoration Process Using Count Data Restoring Process 1 First Variation (FIG. 16))

In step S311 (FIG. 16), the restoration process executing unit 27c outputs a notification of the corruption in the count data pieces (count data piece abnormality), for example, to the control unit 23 (FIG. 4).

(Restoration Process Using Count Data Restoring Process 1 Second Variation (FIG. 17))

In steps S313 and S315 (FIG. 17), the restoration process executing unit 27c determines that the second, third, and fourth count data difference values in the count data difference value sequence for the sorted count data sequence (FIG. 28) match the second, third, and fourth count data difference values in the count data difference value sequence pattern [1] (FIG. 29), and the process proceeds to step S317.

In step S317 (FIG. 17), the restoration process executing unit 27c restores the value of the leading count data piece in the sorted count data sequence according to the count data difference value sequence pattern [1] (FIG. 29), using the value obtained by adding 1 to the value of the second count data piece in the sorted count data sequence. FIG. 30 shows the values of the count data pieces before and after the restoration of the leading count data piece.

Next, in step S321 (FIG. 17), the restoration process executing unit 27c determines that fifth count data difference value (FIG. 28) for the sorted count data sequence does not match the fifth count data difference value (FIG. 29) in the count data difference value sequence pattern [1], and the process proceeds to step S323.

In step S323 (FIG. 17), the restoration process executing unit 27c restores the value of the sixth count data piece in the sorted count data sequence according to the count data difference value sequence pattern [1] (FIG. 29), using the value obtained by subtracting 3 from the value of the fifth count data piece in the sorted count data sequence. FIG. 31 shows the values of the count data pieces before and after the restoration of the sixth count data piece.

(Restoration Process Execution Example 2)

The following describes another execution example of the method for restoring the count data piece according to the present invention. FIG. 32 is a diagram illustrating an example of the count data pieces used in a second restoration process execution example. In this example, (C, L, M, N)=(1, +1, 3, 6).

In step S201 (FIG. 14), the count data sorting unit 27a (FIG. 4) sorts the count data pieces (FIG. 32) in descending order to derive the sorted count data sequence.

FIG. 33 shows a diagram illustrating the sorted count data sequence derived in step S201.

Next, in step S203 (FIG. 14), the count data difference calculating unit 27b obtains the difference values between the adjacent count data pieces in the sorted count data sequence (FIG. 33), and derives the count data difference value sequence.

FIG. 34 is a diagram illustrating the count data difference value sequence derived in step S203.

Then, in step S205 (FIG. 14), the restoration process executing unit 27c determines whether or not the count data difference value sequence (FIG. 34) matches any of the count data difference value sequence patterns [1] to [3] (FIG. 11). Since the count data difference value sequence (FIG. 34) matches none of the count data difference value sequence patterns [1] to [3] (FIG. 11), the process proceeds to step S207 (FIG. 14).

In step S207, the restoration process executing unit 27c determines whether or not first difference value in the count data difference value sequence (FIG. 34) matches the first count data difference value in any of the count data difference value sequence patterns [1] to [3] (FIG. 11). The first difference value in the count data difference value sequence matches first count data difference values in the count data difference value sequence patterns [1] to [3]. Therefore, the process proceeds to step S209.

In step S209, the restoration process executing unit 27c determines whether or not second difference value in the count data difference value sequence (FIG. 34) matches the second count data difference value in any of the count data difference value sequence patterns [1] to [3] (FIG. 11). Since the second count data difference value in the count data difference value sequence (FIG. 34) matches none of the second count data difference value (FIG. 11) in any of the count data difference value sequence patterns [1] to [3], the process proceeds to step S4.

(Count Data Restoring Process 2)

In step S4 (FIG. 14), the restoration process executing unit 27c carries out the count data restoring process 2 (FIGS. 18A and 18B).

In step S401 (FIG. 18A), the restoration process executing unit 27c obtains the addresses of the leading and second count data pieces in the sorted count data sequence (FIG. 33). Here, these addresses are "address [1] and address [6]."

In step S403 (FIG. 18A), the restoration process executing unit 27c extracts the count data address sequence pattern in which the addresses of the leading and the second count data pieces are "address [1] and address [6]" out of the count data address sequence patterns [01] to [12] (FIG. 8). Here, as shown in FIG. 35, the count data address sequence pattern [11] is extracted as the candidate of the count data address sequence pattern.

In step S405 (FIG. 18A), the restoration process executing unit 27c extracts the candidates of the count data difference value sequence pattern (see FIG. 12) that correspond to the count data address sequence pattern [11]. Here, as shown in FIG. 36, the count data difference value sequence patterns that correspond to the count data address sequence pattern [11] are pattern [1] and pattern [3].

In step S407 (FIG. 18A), the restoration process executing unit 27c calculates the residue derived by dividing the value "53" of the leading count data piece in the sorted count data sequence (FIG. 33) by the total number M "3" of the addresses that constitute the minor loop. Here, the residue is "2". The restoration process executing unit 27c determines the count data difference value sequence pattern for restoration, based on the residue "2," out of the count data difference value sequence patterns [1] and [3] that have been extracted in step S405. When (C, L, M, N)=(1, +1, 3, 6) as in this example, the residues "0," "1," and "2" derived by dividing the value of the leading count data piece in the sorted count data sequence by M respectively correspond to the count data difference value sequence patterns [1], [2], and [3] (see FIGS. 9 and 10). The restoration process executing unit 27c determines the count data difference value sequence pattern [3] to be the count data difference value sequence pattern for restoration.

In step S407, the count data difference value sequence pattern for restoration can be determined to be only one pattern. Therefore, in step S409, it is determined to be "YES", and the process proceeds to step S411.

Since the count data difference value sequence pattern for restoration is pattern [3], the process proceeds to step S411 and step S413, and then to step S421.

In step S421, the restoration process executing unit 27c restores third count data piece in the sorted count data sequence, according to the value of the second count data piece in the sorted count data sequence and the count data difference value sequence pattern [3]. The restoration process executing unit 27c obtains a value "49" by subtracting "3" from the value "52" of the count data piece of the address [6] (FIG. 33), and restores the value of the count data piece of the address [5] using the value "49."

FIG. 37 shows the values of the count data pieces before and after the restoration process in step S421.

In step S423, the restoration process executing unit 27c determines that third count data difference value (=49−46=3 (FIG. 37)) after the restoration for the sorted count data sequence matches the third count data difference value in the count data difference value sequence pattern [3]. The process proceeds to step S427.

In step S427, the restoration process executing unit 27c determines that fourth count data difference value (=46−43=3 (FIG. 37)) after the restoration for the sorted count data sequence matches fourth count data difference value in the count data difference value sequence pattern [3]. The process proceeds to step S431.

In step S431, the restoration process executing unit 27c determines that fifth count data difference value (=43−40=3 (FIG. 37)) after the restoration for the sorted count data sequence matches fifth count data difference value in the count data difference value sequence pattern [3]. Thus, the values of the fourth, fifth, and sixth count data pieces in the sorted count data sequence are determined to be normal, and the restoration process is not carried out. Therefore, a final result of the restoration process is as shown by the count data pieces after the restoration in FIG. 37.

The count data recording device according to the embodiment of the present invention is particularly useful for an application of recording count data using a storage device with which only a finite number of writing is allowed.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A count data recording device which records count data pieces in memory areas, the count data pieces representing counting values which vary monotonously at a predetermined width from a predetermined value, the device comprising:
   a storage unit that includes N memory areas respectively storing the count data pieces, where N is an integer equal to or greater than 4;
   a data writing unit that writes a count data piece to said storage unit;
   a data reading unit that reads the count data piece from said storage unit; and
   a data restoring unit that detects a corruption in the count data piece stored in said storage unit and restores the corruption,
   wherein said data writing unit records the count data piece in said storage unit by:
   defining a range of a minor loop by selecting M memory areas out of the N memory areas according to a predetermined order, where M is an integer equal to or greater than 3 and smaller than N, the predetermined order defining an order of the memory areas used for recording the count data piece;
   recording the count data piece using the memory area included in the range of the minor loop according to the predetermined order; and
   shifting the range of the minor loop backward according to the predetermined order after recording the count data piece using a last memory area within the range of the minor loop and setting a new range of the minor loop and
   wherein said data restoring unit: derives a sorted count data sequence by sorting count data pieces in the N memory areas so that values of the count data pieces change monotonously;
   derives a count data difference value sequence by obtaining difference values between adjacent count data pieces in the sorted count data sequence; and
   detects and restores the corruption in the count data pieces stored in the N memory areas based on the sorted count data sequence and the count data difference value sequence.

2. The count data recording device according to claim 1, wherein
   said data restoring unit detects the corruption of at least one of j-th count data piece and (j+1)th count data piece in the sorted count data sequence based on j difference values from first count data difference value to j-th count data difference value in the count data difference value sequence, where the j is an integer from 1 to (N−1).

3. The count data recording device according to claim 2, wherein, when said data restoring unit detects the corruption of M-th count data piece in the sorted count data sequence, said data restoring unit restores the M-th count data piece in the sorted count data sequence based on a residue derived by dividing a quotient by M, the quotient being obtained by dividing a value of first count data piece in the sorted count data sequence by a value of the predetermined width.

4. The count data recording device according to claim 2, wherein, when said data restoring unit detects the corruption of at (M+k)th count data piece in the sorted count data sequence, where k is an integer from 1 to (N−M), said data restoring unit restores the corruption of the (M+k)th count data piece using a value obtained by adding a product of M and a value of the predetermined width to a value of (M+k−1)th count data piece in the sorted count data sequence.

5. A method for recording count data using a count data recording device recording count data pieces in memory areas, the count data pieces representing counting values which varies monotonously at a predetermined width from a predetermined value, the method comprising:
   defining a range of a minor loop by selecting M memory areas out of N memory areas according to a predetermined order, where N is an integer equal to or greater than 4 and M is an integer equal to or greater than 3 and smaller than N, the N memory areas being included in a storage unit and respectively storing the count data pieces by a data writing unit, the predetermined order defining an order of the memory areas used for recording the count data piece;
   recording the count data piece using the memory area included in the range of the minor loop according to the predetermined order by the data writing unit;
   shifting the range of the minor loop backward according to the predetermined order after recording the count data piece using a last memory area within the range of the minor loop and setting a new range of the minor loop by the data writing unit;
   deriving a sorted count data sequence by sorting the count data pieces in the N memory areas so that values of the count data pieces vary monotonously by a data restoring unit;
   deriving a count data difference value sequence by obtaining difference values between adjacent count data pieces in the sorted count data sequence by the data restoring unit; and
   detecting and restoring a corruption in the count data pieces stored in the N memory areas based on the sorted count data sequence and the count data difference value sequence by the data restoring unit.

6. The method according to claim 5, wherein
   in said detecting and restoring, the data restoring unit detects the corruption of at least one of j-th count data piece and (j+1)th count data piece in the sorted count data sequence based on j difference values from first count data difference value to j-th count data difference value in the count data difference value sequence, where the j is an integer from 1 to (N−1).

7. The method according to claim 6, wherein in said detecting and restoring, when the data restoring unit detects the corruption of M-th count data piece in the sorted count data sequence, the data restoring unit restores the M-th count data piece in the sorted count data sequence based on a residue derived by dividing a quotient by M, the quotient being obtained by dividing a value of first count data piece in the sorted count data sequence by a value of the predetermined width.

8. The method according to claim 6, wherein in said detecting and restoring, when the data restoring unit detects the corruption of at (M+k)th count data piece in the sorted count data sequence, where k is an integer from 1 to (N−M), the data restoring unit restores the corruption of the (M+k)th count data piece using a value obtained by adding a product of M and a value of the predetermined width to a value of (M+k−1)th count data piece in the sorted count data sequence.

9. A non-transitory computer-readable medium having stored thereon computer executable instructions which, when executed by a computer of a count data recording device for recording count data, the count data recording device recording count data pieces in memory areas, the count data pieces representing counting values that change monotonously at a predetermined width from a predetermined value, performs:
   causing a data writing unit to define a range of a minor loop by selecting M memory areas out of N memory areas according to a predetermined order, where N is an integer equal to or greater than 4 and M is an integer equal to or greater than 3 and smaller than N, the N memory areas being included in a storage unit and respectively storing the count data pieces, the predetermined order defining an order of the memory areas used for recording the count data pieces;

causing the data writing unit to record the count data piece using the memory area included in the range of the minor loop according to the predetermined order;

causing the data writing unit to shift the range of the minor loop backward according to the predetermined order after recording the count data piece using a last memory area within the range of the minor loop and to set a new range of the minor loop;

causing a data restoring unit to derive a sorted count data sequence by sorting the count data pieces in the N memory areas so that values of the count data pieces vary monotonously;

causing the data restoring unit to derive a count data difference value sequence by obtaining difference values between adjacent count data pieces in the sorted count data sequence; and causing the data restoring unit to detect and restore a corruption in the count data pieces stored in the N memory areas based on the sorted count data sequence and the count data difference value sequence.

10. The non-transitory computer-readable medium according to claim 9, wherein in said causing the data restoring unit to detect and restore, the data restoring unit is caused to detect the corruption of at least one of j-th count data piece and (j+1)th count data piece in the sorted count data sequence based on j difference values from first count data difference value to j-th count data difference value in the count data difference value sequence, where the j is an integer from 1 to (N−1).

11. The non-transitory computer-readable medium according to claim 10, wherein in said causing the data restoring unit to detect and restore, when the data restoring unit detects the corruption of M-th count data piece in the sorted count data sequence, the data restoring unit is caused to restore the M-th count data piece in the sorted count data sequence based on a residue derived by dividing a quotient by M, the quotient being obtained by dividing a value of first count data piece in the sorted count data sequence by a value of the predetermined width.

12. The non-transitory computer-readable medium according to claim 10, wherein in said causing the data restoring unit to detect and restore, when the data restoring unit detects the corruption of at (M+k)th count data piece in the sorted count data sequence, where k is an integer from 1 to (N−M), the data restoring unit is caused to restore the corruption of the (M+k)th count data piece using a value obtained by adding a product of M and a value of the predetermined width to a value of (M+k−1)th count data piece in the sorted count data sequence.

* * * * *